United States Patent [19]
del Ser Gonzalez

[11] Patent Number: 4,596,182
[45] Date of Patent: Jun. 24, 1986

[54] METHOD FOR PROVIDING TOPS TO CLOSE PITTED FRUIT AND A MACHINE FOR PUTTING IT INTO PRACTICE

[76] Inventor: Clemente del Ser Gonzalez, Paseo Talleres 36, Madrid 21, Spain

[21] Appl. No.: 577,784

[22] Filed: Feb. 7, 1984

[30] Foreign Application Priority Data

| | | |
|---|---|---|
| Feb. 7, 1983 [ES] | Spain | 519.602 |
| Jun. 23, 1983 [ES] | Spain | 523.580 |
| Jun. 25, 1983 [ES] | Spain | 523.589 |
| Jun. 25, 1983 [ES] | Spain | 523.590 |
| Jan. 30, 1984 [ES] | Spain | 529.286 |

[51] Int. Cl.$^4$ ............................................. A23N 4/08
[52] U.S. Cl. .................................... 99/491; 99/494; 99/547
[58] Field of Search ............... 99/494, 486, 537, 538, 99/547, 548, 549, 552, 555, 556, 557–558, 565, 566, 567, 635, 642, 646 R, 489–491

[56] References Cited

U.S. PATENT DOCUMENTS

| | | | |
|---|---|---|---|
| 4,096,794 | 6/1978 | del Ser Gonzalez | 99/494 |
| 4,096,795 | 6/1978 | del Ser Gonzalez | 99/494 |
| 4,102,257 | 7/1978 | del Ser Gonzalez | 99/494 |
| 4,182,233 | 1/1980 | del Ser Gonzalez | 99/494 |
| 4,290,350 | 9/1981 | del Ser Gonzalez | 99/494 |

*Primary Examiner*—Timothy F. Simone
*Attorney, Agent, or Firm*—Wenderoth, Lind & Ponack

[57] ABSTRACT

A method for inserting tops for closing pitted fruit includes the steps of placing a piece of food on a conveyor belt, sliding the piece of food under a viewer, detecting the size and the position of the piece of food, supplying information on the position of the piece of food from the viewer through an electronic circuit to a die-cutting head, die-cutting the piece of food to obtain a segment thereof, cutting the segment into strips, transferring the strips to another conveyor belt, aligning the strips longitudinally on this other conveyor belt, supplying the aligned strips to a drum provided with a plurality of chambers, cutting the strips into closing tops, pitting a fruit in a pitter machine, placing the closing tops into housings in a turning plate, synchronizing the turning of the housings in the turning plate with the turning of the pitter machine, and stuffing one of the closing tops into the mouth of the pitted fruit.

26 Claims, 21 Drawing Figures

C-D

E-F

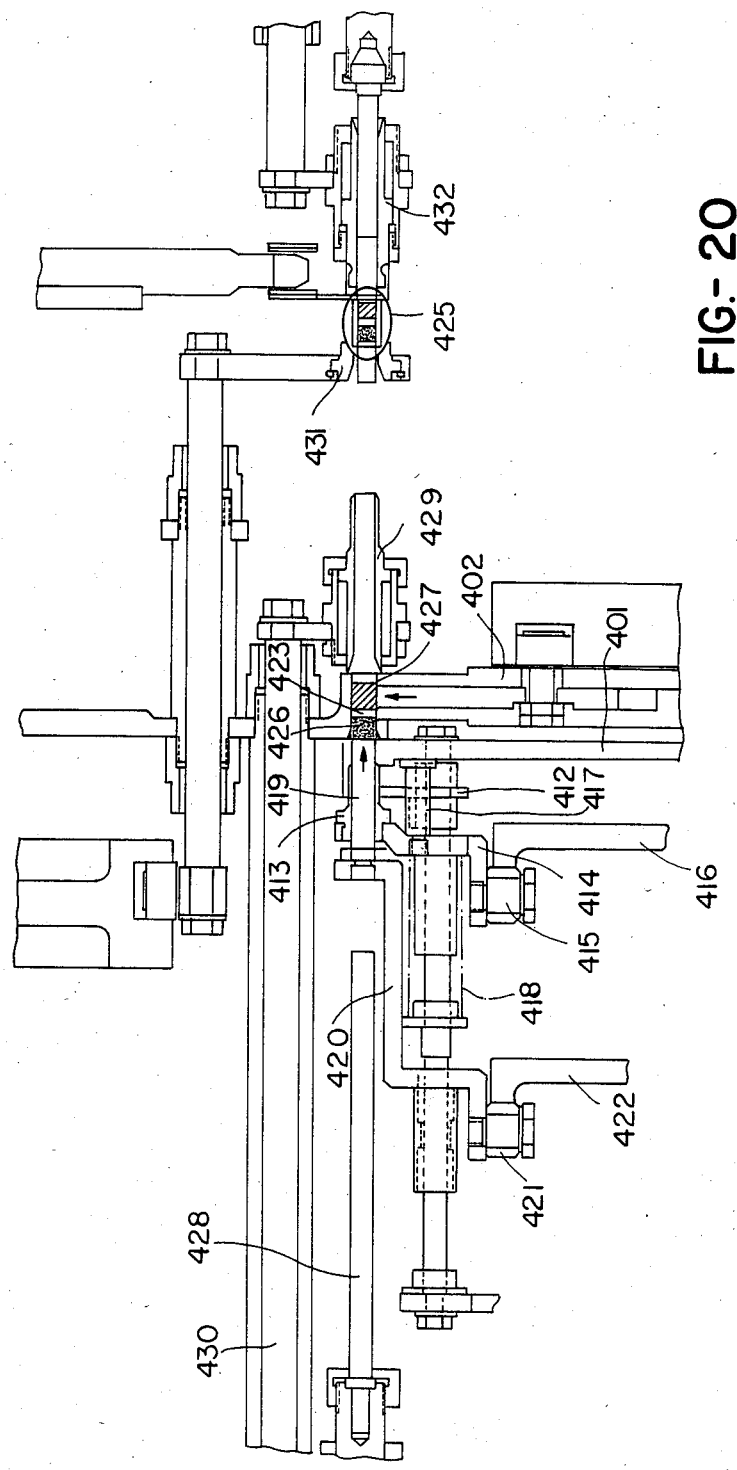

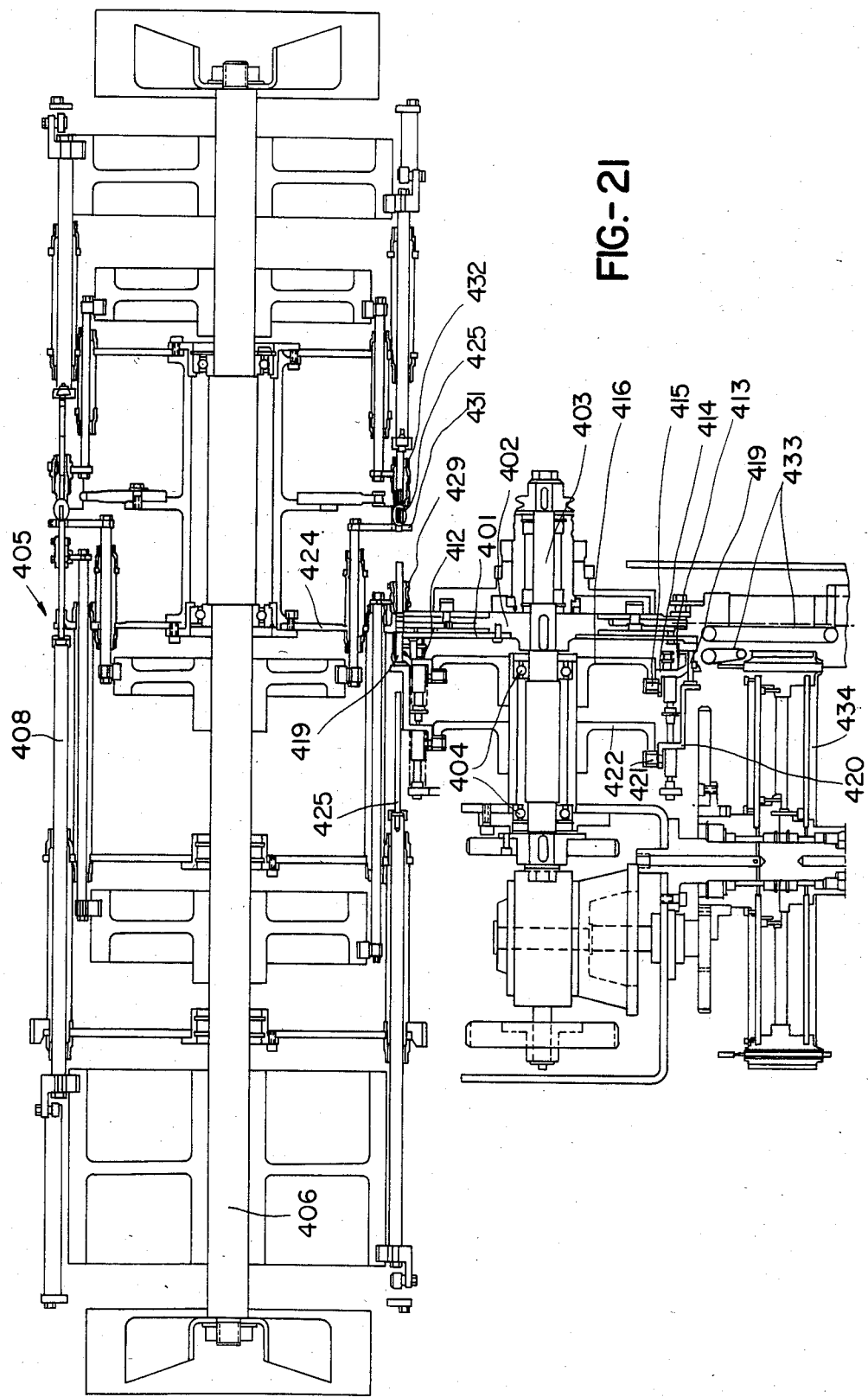

METHOD FOR PROVIDING TOPS TO CLOSE PITTED FRUIT AND A MACHINE FOR PUTTING IT INTO PRACTICE

BACKGROUND OF THE INVENTION

1. Field of the Invention

This invention refers to a method for providing tops to close pitted fruit, and also a machine for putting this method into practice.

As a most significant example, the invention provides a method for putting pepper tops, from natural pepper, into olives, already stuffed with any type of filling, such as pepper paste, anchovy, etc., although obviously, the invention is applicable to any other type of pitted fruit.

Nevertheless, in order to simplify the following description, this disclosure is going to be made, based on providing pepper tops for closing stuffed olives, whose stones have previously been removed.

2. Description of the Prior Art

Within the industrial scope in which the invention is to be applied, processes for removing the stones of olives are very well known, and also for stuffing them with anchovy paste, pepper or any other kind of filling; techniques are also known for subsequently "closing" the olives, through the "top" itself.

For obvious reasons, in many cases, it is desirable that the olive be closed with the aid of a "natural pepper top". However, whereas closing it with the actual pulp of the olive is relatively easy, because the pulp has the same consistency as the olive, the use of natural pepper as the raw material has proved impossible until now, as it is a different kind of product then the olive and has very little physical consistency, which makes it extremely difficult to handle.

SUMMARY OF THE INVENTION

Through the method which the invention proposes, it is possible to obtain tops for stuffed olives from natural pepper, and also to place them in the olive with optimum guarantees of a perfect finish.

The method which the invention proposes is based on obtaining by cutting rectangular pieces with identical superficial dimensions from automatically selected natural peppers, opened and stretched out. In a second operative stage, a plurality of strips are obtained from these segments which, in turn, are identical in width and length, the latter being defined by the maximum size of the segments, according to the size of the peppers available, while their width depends on the dimensions of the top to be obtained.

In another operative stage of the method, the strips obtained in the previous stage are aligned longitudinally, forming a perfect continuous line, although logically interrupted by the separating cuts between the different units. This alignment of strips is supplied to a drum in which a successive transversal cut is made in it to obtain tops having both their dimensions, i.e. length and width, cut in accordance with the needs required.

A drying type assembly between this drum and the drum of a conventional pitter-stuffer machine, enables the tops thus obtained to be transferred to the machine in question and, after the olive has been stuffed, suitable pushing devices place the top correctly, closing the opening of the olives.

It can be deduced from the foregoing description that the supply process takes place completely automatically without further manpower being necessary, as we shall see later, than that for initially supplying the peppers on a conveyor belt on which the work starts.

To obtain the first stage of putting this method into practice, i.e., that of cutting the irregular shaped raw food materials or parts, to obtain perfectly rectangular segments, an installation has been provided, one of whose main features is centered on the fact that the conveyor belt on which the parts to be cut are placed, is divided into regular stretches, in proportion to the size of the parts to be received, so that these parts are delivered, placing only one of them on each stretch; these stretches can consist of articulated trays or in simple optical demarcations on the belt surface.

Preferably the surface of the conveyor belt should assist the optical locating, by contrast, of the parts placed in isolation within each stretch, whatever the specific position is, which is quite arbitrary.

Next, the parts spaced out on the belt will be located optically by a viewer which will detect both the relative position of the part within the respective stretch of the belt, and the sufficient useful shape which the part offers to make the preset cut in it. According to a given template, optical information will be analyzed electronically and converted into signals which in turn will be transmitted to the relevant head which will have to face the stretch of belt affected, making this head inoperative, if the part has been analyzed as not suitable for cutting, or making this head operative, mobilizing it for the cutting device, according to the preset template to be placed over the part and to cut and lower onto it, suitably guiding the template, so that cutting takes place as each irregular part requires. The head itself then lifts the regular cut segment obtained, removing it from the conveyor belt and taking it to another delivery point, whereby only the remains of the cut-out parts and those rejected as being insufficient, will be left on the conveyor belt, which will immediately be removed to leave the stretches of the belt free and available again for non-stop working. To achieve this continuity, more than one cutting head has been provided, so that there is always one of them available for cutting, while the other is transferring and delivering the cut-out segment.

Having developed the automatic installation which has been substantially disclosed with a view especially to cutting and using natural peppers, for subsequently handling them, the foregoing will now be developed and specified in connection with an installation for cutting peppers, although this exposition will only be by way of preferential example, but not exclusive, of the invention obtained.

Taking natural pepper as a basic example for making this description, it is obvious that each pepper will have different dimensions and that one way of mechanizing the top shaping process consists of obtaining a rectangle from each pepper, which is subsequently cut in strips whose width corresponds to the tops, later to cut these strips and shape the actual tops.

As is also obvious, the peppers can be selected by hand and placed perfectly under a cutting die with which the necessary cutting foreseen is obtained, but this form of action is extremely slow and, consequently, either involves very low operativity of the machine or high intervention of labor to supply the raw material.

The device which the invention proposes has been specially designed to achieve high functional performance of the machine with minimum manpower.

In this sense, a single operator can place the different peppers on a conveyor belt, without worrying about their size or the exact place where he puts them, within each tray or in each limited sector of the conveyor belt, it being the device which detects the exact position of each pepper, makes a selection determining its dimensional capacity, and shifts its cutting head to duly place it above the pepper in question, to carry out the diecutting or cutting. Once the pepper part is obtained, duly shaped by the cutting knife, the head itself holds and shifts it, taking it towards the device corresponding to the following operative stage of the machine.

These practical demands occur not only in peppers, as explained above, but also in numerous other products which by their nature, specifically due to their lack of consistency, are difficult to transfer mechanically on the belt, and to arrange at a given position. Thus, it has to be the cutting head which shifts to find the part.

For this step, there is an objective in the conveyor belt receiving the pepper parts, in which trays or compartments are made corresponding to the respective units. Each of these trays detects the positioning of the part to be located and the dimensions of that part, to make its selection. The information taken through the objective is processed in an electronic circuit which controls the cutting head, determining its displacement until it faces the part to be diecut correctly, with the absolute certainty that a part will be cut out in the shape and dimensions foreseen and, naturally, complete.

After the cutting head is in the correct position, it drops to perform the diecutting.

The head then communicates with a hollow dish, to which the cut-out part sticks and then it starts to go up and move towards the place foreseen for putting that part, also duly programmed in the control circuit of that head; its hollow dish withdraws when it reaches this place.

To arrange the shifting of the cutting head, duly controlled by the electronic monitoring circuit, it has been foreseen that this head should be installed on two nuts, which act on respective spindles mounted on a frame and are driven by a drive element, preferably pneumatic or hydraulic, which is stopped and started by the said circuit; at the same time, the said frame is solidly joined to two pairs of nuts which act on a further two spindles, perpendicular to the previous ones and arranged on a different plane, which spindles in turn are driven simultaneously by another drive element likewise controlled by the electronic circuit.

Obviously, the drive of one of these motors causes the longitudinal displacement of the head, while the drive of the other motor causes its transversal displacement, the combination of both displacements determining absolute mobility, in any direction, of the said cutting head, on a plane parallel to the conveyor belt.

In accordance with a preferred embodiment given below as an example, the structure disclosed shall be double, i.e. that the device shall include two cutting heads, assisted by identical auxiliary elements, mounted on a common frame, pivoting, so that while one of the cutting heads places one diecut part, the other performs the approaching, cutting and retention operations of the following part.

This combined operativity can be obtained by pulsating rotating movements of the frame assembly, or through alternating movements of 180°.

In accordance with an embodiment variation for the installation corresponding to this first operative stage of the method, the aforementioned mechanical-electronic installation can comprise a fully mechanical solution in which, with slightly more labor, considerable structural simplification, greater operative reliability and a considerable reduction in costs is achieved.

According to this embodiment variation, the conveyor belt is made with an alignment of knives or cutting templates, suitably distributed throughout its length, on which the respective pepper parts are to be placed by hand, in any position, provided the contour of the knife does not jut out with respect to the contour of the part. The alignment of knives carrying the respective pepper parts move forward as the chain does and pass in sequence under a cutting roller which presses the pepper parts against the edge of the templates or knives, enabling identical parts with a regular outline to be obtained, coinciding with the shape of the actual template. The parts thus obtained are kept inside the knives since these are box-shaped, closed at the bottom, while the surplus cutting or trimmings are ejected with the aid of a blower device mounted on a chain following the cutting roller.

At the end of the operative course of the chain, and this constitutes another of the basic features of the invention, this chain splits into two sectors, one which returns as the bottom part, and which forms the bottom of the boxes, and the other which returns as the top part, and which forms the knives as such.

Thus, it can be said that it concerns two duly synchronized chains, which describe respective closed cycles and which combine, determining a single chain in one sector of their path, to be precise in the sector in which these chains are operating, corresponding to the feeding and cutting of the pepper parts.

This installation is foreseen to participate in working the method disclosed in Spanish Pat. No. 519,702, whereby the regular parts obtained by cutting have to be supplied to a drum in which they will subsequently be cut into strips.

In this connection, the knife-holder chain extends beyond the basic chain; a plate has been provided, forming a coplanar extension of the basic chain, which in turn is at a tangent with the receiver drum of the parts and which is interrupted, corresponding to the depositing area on said drum, where the knives lose their rectilinear path to start their return by the top area of the installation. This plate maintains the closed position for the frame defined by each knife or template, thus preventing the parts from leaving this frame by the force of gravity.

At the end of this plate, a pair of side blades have been provided, which temporarily support the pepper part on leaving the plate and which, once the part has completely left the plate, open, and let the pepper drop on the drum. A pressure roller finally ensures that the part is correctly adapted to the aforementioned drum.

Because the installation can be used with pepper parts of different thicknesses and, consequently, of different weights, placing the parts simply by gravity could lead to loss of synchronism, from some cases to another; hence, the invention has been designed that this placing step can be performed with the assistance of a pneumatic ejector, thereby achieving perfect sychronism.

Obviously, the installation is completed with a series of accessory elements such as toothed crowns for establishing the circuits of the two chains, tensioning devices for them, synchronized drive transmission elements, a pneumatic unit for the ejectors, which can be common to the rest of the machine, etc.

After developing the installation which has been basically disclosed, with a view especially to cutting and using natural peppers, for subsequently handling them, the foregoing will now be developed and specified in connection with an installation for cutting peppers, although this exposition will only be by way of preferential example, but not exclusive, of the invention obtained.

Taking natural peppers as the basic example for making this description, it is obvious that each pepper will have different dimensions and that one way of mechanizing the top shaping process consists of obtaining a rectangle from each pepper, which is subsequently cut into strips, whose width corresponds to the tops, cutting these strips later and shaping the actual tops.

Once the peppers have been opened out, they will be placed on each of the knives of the whole sector of both chains, for which purpose, this sector will be of considerable length to enable the raw material to be supplied with ease, each of the peppers being able to adopt any position with respect to the corresponding knife, provided the outline of the knife does not jut out with respect to the contour of the pepper.

To put the third operative stage of the method into practice, in which the rectangular parts obtained in the previous stage are cut in strips to be supplied, in line, to the respective devices to the third and last operative stage, an automatic installation has been provided which, basically, comprises a drum or fixed cylinder, provided in its periphery with a plurality of cavities or hollows, aligned perimetrically and with different aims, as we shall see further on. A rotating cylindrical ring is fitted onto the drum, which converts the hollows into chambers and on which the parts of the product to be cut into strips are placed.

A cutting element assists this drum, with which the strips are obtained, which works as the cylindrical ring turns, the strips obtained subsequently being supplied, one by one, to a pair of conveyor belts, so that these strips, arranged parallel after being cut, go on in line, forming perfect continuity in the supply.

This arrangement is made preferably in the top area of the drum and corresponding to a chamber subject to a vacuum, so that the product is perfectly adapted to that drum, despite the effects of gravity and centrifugal force.

In this sector of the drum subject to a vacuum, a cutting knife assists it, which approaches the drum in the direction of its generatrices and with a frequency which, duly calculated in accordance with the turning speed of the drum, cuts the pepper segment in strips of the required width.

After the cutting operation, the aforementioned hollow continues to keep the different strips adhered to the drum.

This "suction" effect is achieved because that the drum, in its outer cylindrical ring, is provided with a plurality of holes, through which suction takes place.

In another point of the drum, corresponding to another hollow, the vacuum is interrupted and an instantaneous pressure area is established, in which the strips of product are cast forward against a conveyor belt, arranged at a tangent with respect to the actual drum, and at a slight distance from it; this conveyor belt, in turn, is perforated and subject to the vacuum. This belt drags the strips of product in a direction parallel to the generatrix of the drum and, after passing it, a second conveyor belt cooperates with it, which acts on the opposite side of the strip of product, to drag it to the shaper and supply device of the tops.

Completing the structure disclosed, we could also stress that in other chambers or hollows of the drum, washing and drying areas are established for the cylindrical ring, after placing the strips of product.

Finally, the third and last operative stage of the method takes place through an installation for cutting and supplying the tops which, receiving a continual strip of natural pepper, thanks to the previous stage, although with interruptions, cuts it in individual sectors, shapes it and supplies it to the olive, after the corresponding stuffing product has been placed inside it.

Consequently, the installation which the invention proposes is made up of a rotating disk, which will be suitably synchronized to the machine to which it is coupled. This disk will receive the continuous strip of product radially, for example through a pair of conveyor belts or by any other suitable system.

This disk will have a plurality of housings in its periphery, assisted by the respective cutting knives, so that the continuous strip of material reaches each housing and, through the turning effect of the disk, is cut by the knife, making a sector of sufficient size to form the top it is wished to obtain, the end of the continuous strip then moving on to the following housing, where the cutting takes place of another individual sector; this cycle is repeated indefinitely.

There is a hole inside each of these housings, whose axis is parallel to the actual disk and whose diameter coincides with that of the top it is wished to obtain; there is also an annular rammer and a likewise annular knife, whose inner diameter coincides with that of the hole or drill, coaxial to it and inside which a pusher shank works.

The disk making up the main element of the installation is installed with its axis parallel to that of the drum of the machine so that its periphery is aligned with said drum, all to ensure that the circular holes of the aforementioned disc are instantaneously coaxial with the respective cylindrical housings made in another disk in the drum of the machine, to receive the pepper top and, subsequently, to supply it to the olive.

In accordance with the aforegoing operation, the rotating disk receives the strip of product radially in a point of its periphery, causes its gradual cutting into individual sectors, which are coupled in the respective housings, and as it turns, through adequate eccentric wheels, each rammer is shifted, to fix the individual portion to the opening of the circular hole, the subsequent displacement of the knife which diecuts a circular segment and finally the displacement of the shank which inserts it in the hole itself. When this drill converges coaxially with the corresponding hole of the machine disk, it pushes it instantaneously and with sufficient scope, so that the top is transferred from one disk to another.

The disk in the device which the invention proposes repeats the work cycle to continue receiving units of product, while the disk of the machine, after receiving the top, also continues turning and another pusher shank makes that top move to its correct position in the opening of the olive, after placing therein the material used as the stuffing.

BRIEF DESCRIPTION OF THE DRAWINGS

The object of the invention will be understood better with the aid of the following description, and in relation to the attached drawings, in which:

FIG. 20. Shows a similar illustration to the previous figure, but corresponding to the transfer area of the top to the pitting machine drum. In this figure, the auxiliary devices of the machine drum have also been illustrated, together with a partial view of the stuffing paste supplier.

FIG. 21. Finally shows the installation corresponding to this third and last stage, as a whole, coupled to the drum of the machine which this installation has to complement, together with the supply devices of the continuous strip.

DETAILED DESCRIPTION OF THE PREFERRED EMBODIMENTS

Figure 1:
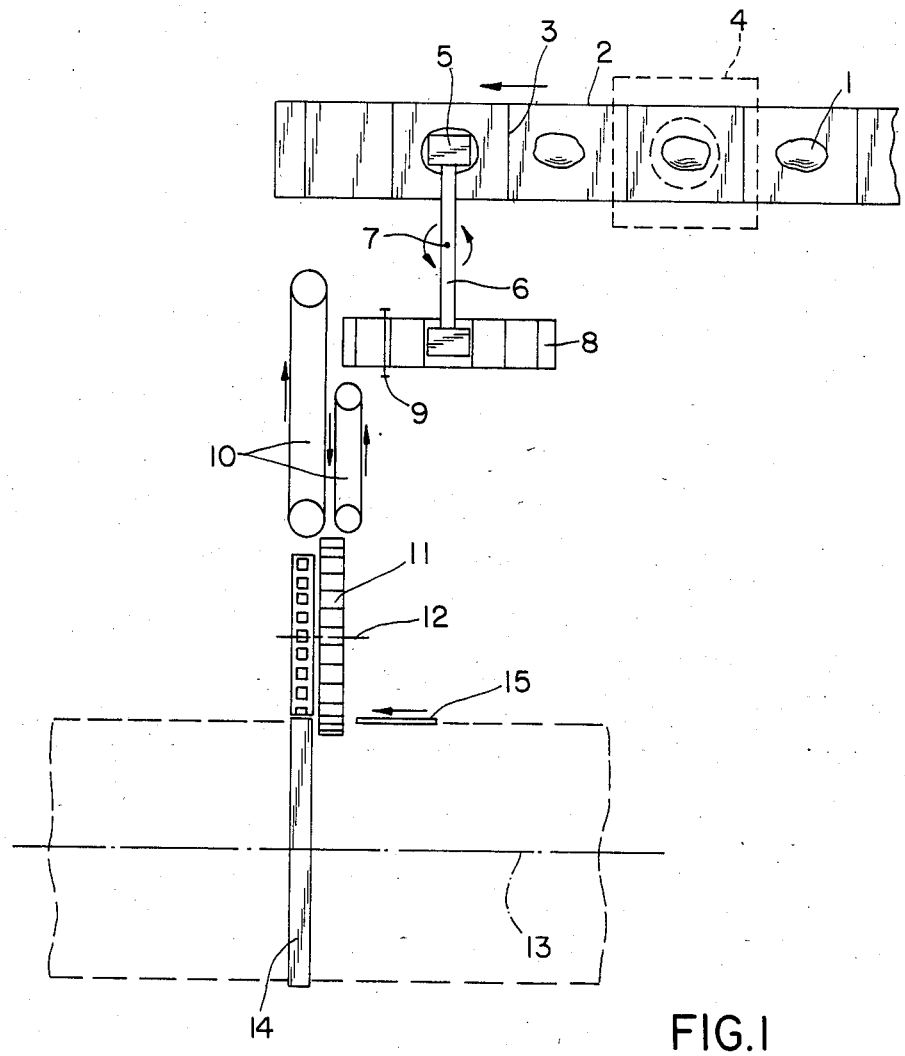
FIG. 1. Shows a schematic illustration of an imaginary work line for putting the method of the invention into practice.

In the light of FIG. 1, it may be seen how the natural peppers 1, opened and outstretched, are placed on a conveyor belt 2 or any other sliding element, in which specific areas are defined for placing each of these units, so that each of these areas, defined in the figure by a transversal line 3, corresponds to a single piece of pepper 1, although this piece can be in any position within the respective area.

A viewer 4, for example such as a video camera assisted by the respective electronic circuit, analyzes the size of the pepper part 1, determining whether it is possible to obtain the rectangular segment foreseen from it, at the same time memorizing the exact position of that part in the corresponding area of the conveyor belt 2.

The description and detailed representation of the electronic circuit have been omitted in as much as it is a conventional circuit for which there are many practical embodiments which operate in the same manner but which are structurally different from each other.

If the dimensions of the pepper part 1 are insufficient, it is rejected and if, on the other hand, and as will happen in the immense majority of cases, this part meets the dimensional requirements foreseen, the viewer 4 will supply the relevant information to a cutting head 5, so that it shifts adequately onto the corresponding sector of the belt 2 and is placed operatively above the part 1 to be cut, in the correct position.

To do so, the cutting head 5 will have a rectangular periphery, in accordance with the dimensions foreseen for the different rectangular segments and, furthermore, will be designed to shift in any direction within a field corresponding to the area of each piece of pepper, and also to vary the turning position with respect to its center, to adopt the most suitable direction.

After this operative stage, in which the cutting head 5 has decided on obtaining a segment, another operative stage is established, in which this segment has to be cut in strips. For this, the cutting head 5 will be provided with means which keep the cut segment adhered to it and, with the aid of an arm 6, will tilt on a shaft 7 to place this segment on a drum 5, with which a knife 9 will cooperate, working preferably parallel to its spin axis and making a cut in the strips.

Obviously, this knife 9 will be subject to an alternating movement, whose speed will depend on the turning speed of the drum 8 and of the width set for the strips, at the same time as the turning speed of the drum 8 will also depend on the work speed of the cutting head 5, all these elements being duly synchronized.

After obtaining the strips, and in a second operative stage, these strips are placed by the aforementioned drum 8 on a pair of conveyor belts 10, spaced in keeping with the thickness of the pieces of pepper and between which the perfect alignment of these strips is achieved, with the particularity, moreover, that each strip is in contact at its ends with the one which precedes it.

After obtaining this alignment of the strips of pepper, the conveyor belts 10 themselves supply this alignment to a second cutting drum 11 which, preferably provided with tangential knives, obtain the pepper tops which will preferably have a length the same as their width.

The layout of the drum 11, with its shaft 12 parallel to the shaft 13 of the work drum 14 of a conventional pitting-stuffing machine and the assembly of both drums, as seen schematically in the figure, enables the pepper top obtained by cutting in the drum 11, to be transferred to the drum of machine, 14, at the moment when both drums are aligned, through the use of the actual pushing devices 15 of the machine, or by any other suitable system, which may vary according to the characteristics of each machine.

Obviously, between the drum 11 and the drum 14 there will also be perfect synchronism, so that the housings of the drum 11, in which the pepper tops are placed, are placed exactly opposite the receiver holes of the drum 14 of the pitter-stuffing machine, so that the pushing device 15 can perform its intended function.

To summarize the present invention as described above in other words, the peppers 1 are manually laid down on the space provided on the conveyor belt 2. The peppers 1 advance on the conveyor until the conveyor reaches a position facing the cutting head 5. The cutting head 5 descends and cuts out of each extended pepper 1 a rectangular portion, as seen in FIG. 1, thus transforming a pepper 1 of irregular contour into a piece of pepper with a perfectly rectangular contour. The peripheral trimmings are later used to make a pepper paste.

The rectangular piece obtained from each pepper 1 is retained in the cutting head 5 by suction or by another absorption effect. By rotating the shaft 7, the piece of pepper is then laid down onto the periphery of a revolving drum 8. This drum 8 rotates and receives a radial and reciprocating strike of a knife 9 which cuts each rectangular piece of pepper into elongated strips with a width of about the same magnitude as the diameter of the opening in each olive. Immediately after their cutting by the knife 9, the strips of pepper are taken between the conveyor belts 10. Between the conveyor belts 10, all the strips of pepper align themselves longitudinally and are then provided to another drum 11. While on the periphery of the drum 11, each of the pieces of the pepper reach a position facing a corresponding olive which has been pitted. As a consequence of the synchronized rotation of the drum 11 and the pitting drum 14, the pieces of pepper are transferred by the pushers 15 into the openings made in the pitted olives so that such pieces of pepper finally close such olives as tops.

As previously stated, the cutting head 5 has the purpose of eliminating the irregular contour of the pepper and transforms each pepper into a piece with a geometrically perfect rectangle. To this end, the cutting head 5 is provided with a rectangular knife with dimensions suitable to the size of the peppers 1 which are to be provided to the machine. Each rectangular piece of pepper 1 is then retained by the cutting head 5, as previously mentioned, by the vacuum created therein. After the cutting head 5 is raised, moved away from the conveyor belt 3, and later rotated by the motion of the shaft 7 to a position facing the drum 8, the vacuum created in the cutting head 5 is removed, thus causing the rectangular piece cut from each pepper 1 to be dropped upon the periphery of the drum 8.

Figure 17:
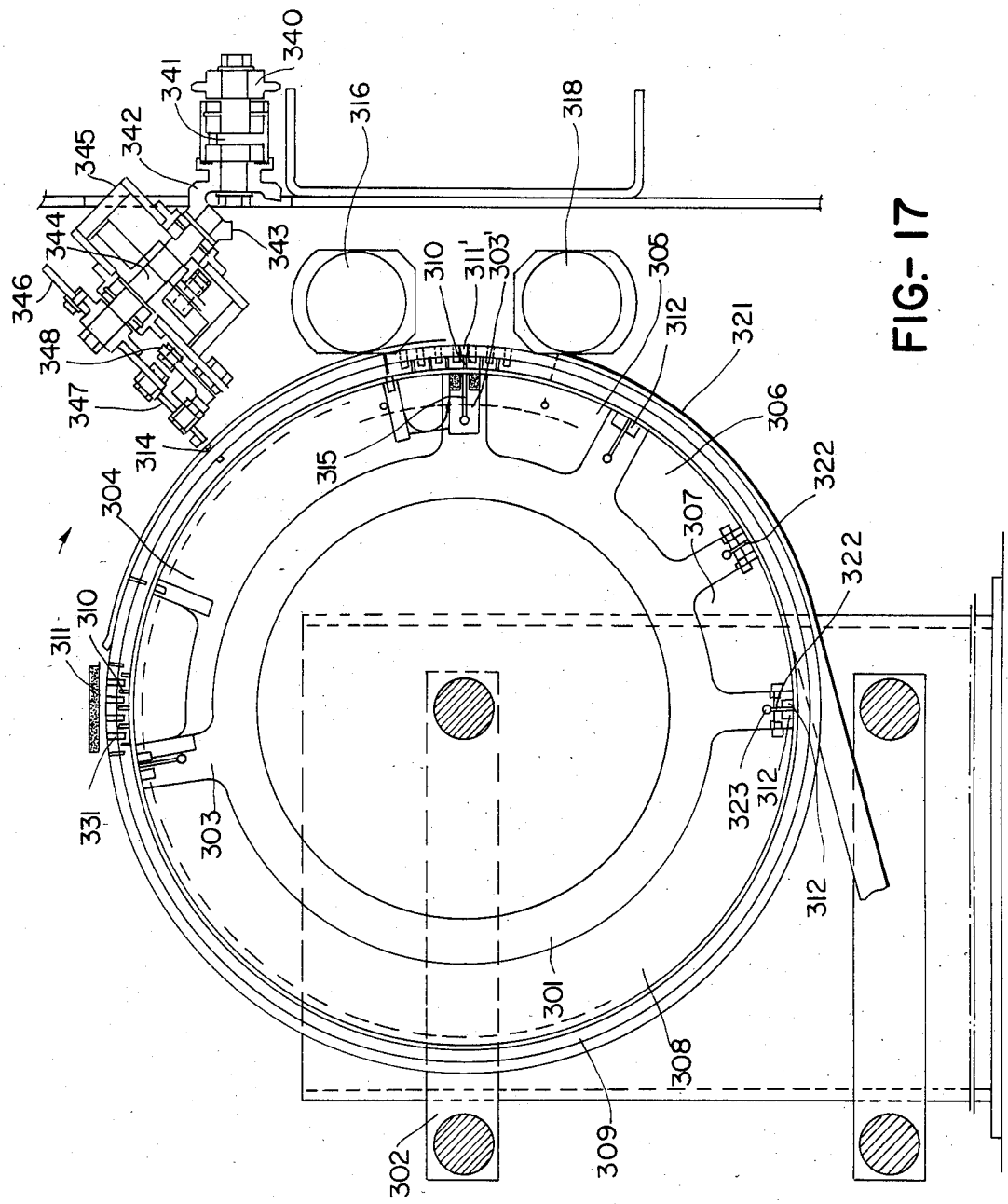
FIG. 17. Shows a side elevation view and cross-section of the cutting and feed drum, with which the second operative stage of the method is performed.

The knife 9, used for cutting the rectangular pieces of pepper 1 into narrow strips of a width which is just as wide as the opening to each pitted olive, appears in detail in FIG. 17. In such FIG. 17, the cutting knife is indicated by the reference numeral 314. The detailed description of the operating mechanism for the cutting knife 9 has been omitted in as much as it is known to be conventional. Such operating mechanism is used in any knife which is subjected to a reciprocating and continuous cutting movement.

It can be gathered from the foregoing that, despite the lack of consistency of the product used as the top, i.e. peppers, this inconsistency can be handled and controlled perfectly throughout the process, as has been mentioned above and as can be seen from the description made, and which takes place completely automatically, without the further intervention of labor than that of placing the open pieces of pepper 1, on the conveyor belt 2.

Lastly, it should also be stressed that the method does not involve any waste of material, since the pieces of pepper not accepted as valid, and also the cuttings made by the cutting head 5 for obtaining the rectangular segments, can be recovered to obtain pepper paste for stuffing olives.

To put the first operative stage of the method into practice, and in accordance with the illustrations in FIGS. 2 to 7, a conveyor belt 101 (FIG. 6) has been provided, comprising a plurality of trays 102, sufficiently sized so that each of them can have a pepper part placed on them, without too much precision, and consequently rapidly.

Figure 6:
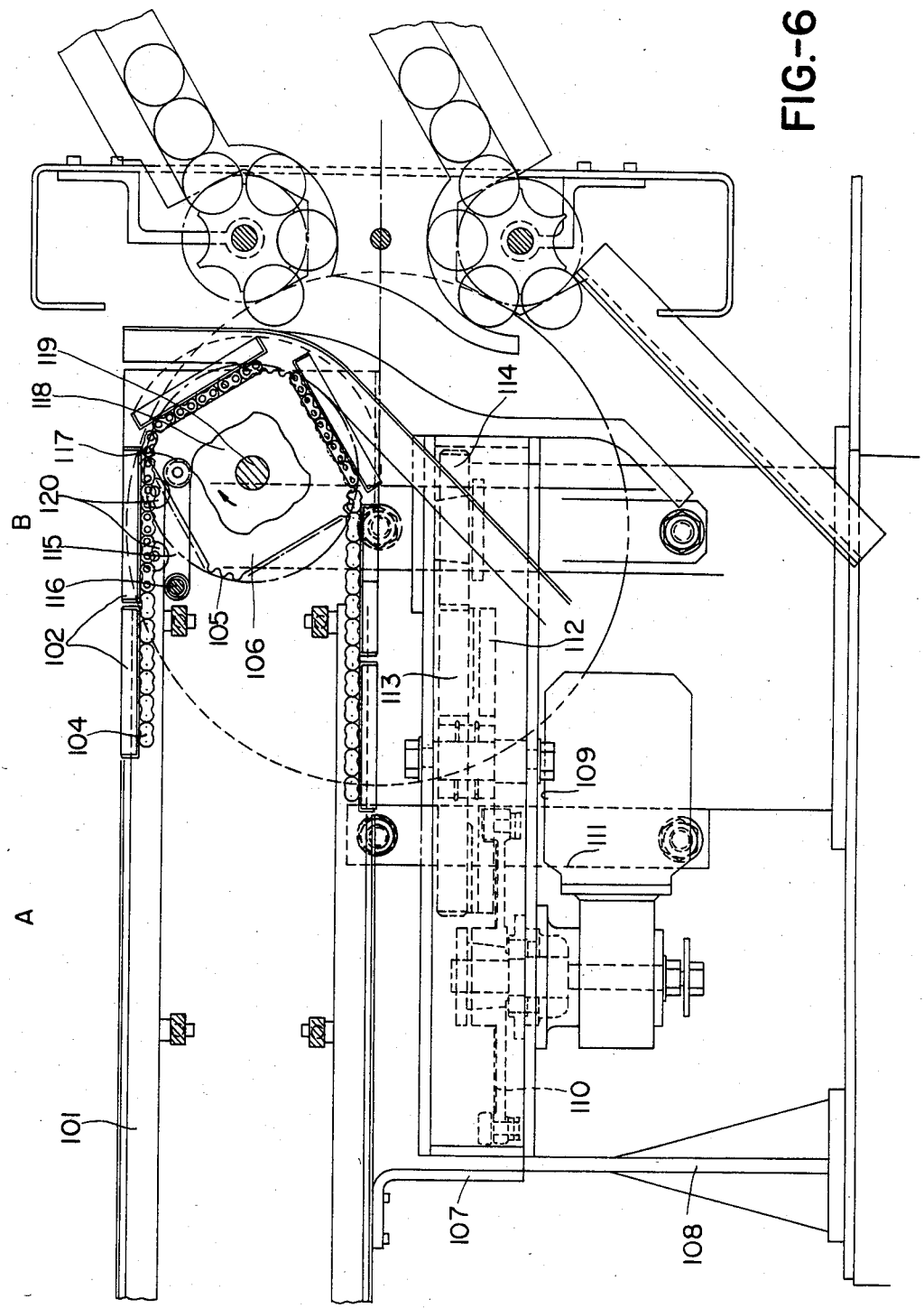
FIG. 6. Shows a side elevation detail and cross-section of the conveyor belt through which the unprepared parts are fed, in the same assembly as the previous figures.

On this conveyor belt 101, approximately in the area marked with the letter A in FIG. 6, the viewer above each of the trays 102 is placed, for detecting the position of the respective pepper parts on them and, finally, of their shape and size. These data, obtained through the viewer, are supplied to the electronic circuit, which will duly process them to accept each of these parts as valid or not and, in the case that a particular part is selected as valid, to cut a rectangular segment out through diecutting.

The cutting head, 103 in FIG. 6 will be placed approximately in the area shown with reference B in FIG. 6, and will shift within a parallel plane to that of the tray 102 throughout its width and, after being placed opposite the part, will lower to make the diecutting.

Returning to the conveyor belt 10 in FIG. 1, the different trays 102 in FIG. 6 are associated to a pair of side chains 104, which are dragged by a pinion 105, with the particularity that this pinion 105 is mainly quadrangular in shape, with its vertices bevel-edged and with teeth 106 just in those vertices, so that the chain 104, in its end return areas, can keep a rectilinear layout in the different sectors corresponding to the respective trays 102, as these are stiff.

Obviously, this assembly rests on a bedframe 107 which, with the assistance of legs 108, decide on the suitable working level of the conveyor belt 101 with respect to the rest of the device. The bedframe 107 serves as an element for holding the motor 109 in charge of driving the belt 101, which driving takes place intermittently; for this, the output shaft of the motor 109 has a star wheel 110 coupled to it, whose rollers 111 transmit their continuous turning movement in a pulsating movement, through the intermittent sprocket 112, said sprocket 112 being associated with a crown 113 with which the movement is transmitted to the shaft 114, which in turn transmits movement to the belt 101.

Special mention should be made of the fact that under the upper sector of the belt 101 and corresponding to the tray 102 which is to undergo the impact of the cutting head 103, there is a bracket 115, tilting on a shaft 116, and provided at its opposite end with a roller 117, which slides on a cam 118, joined to the actual shaft 119 of the pinion 105, so that the moment the tray 102 receives the impact of the cutting head 103, the cam 118 keeps the bracket 115 in a raised position, it being said bracket 115 which receives this impact through the rollers 120 on which the tray 102 rests momentarily, as can be seen in FIG. 6.

Figure 3:
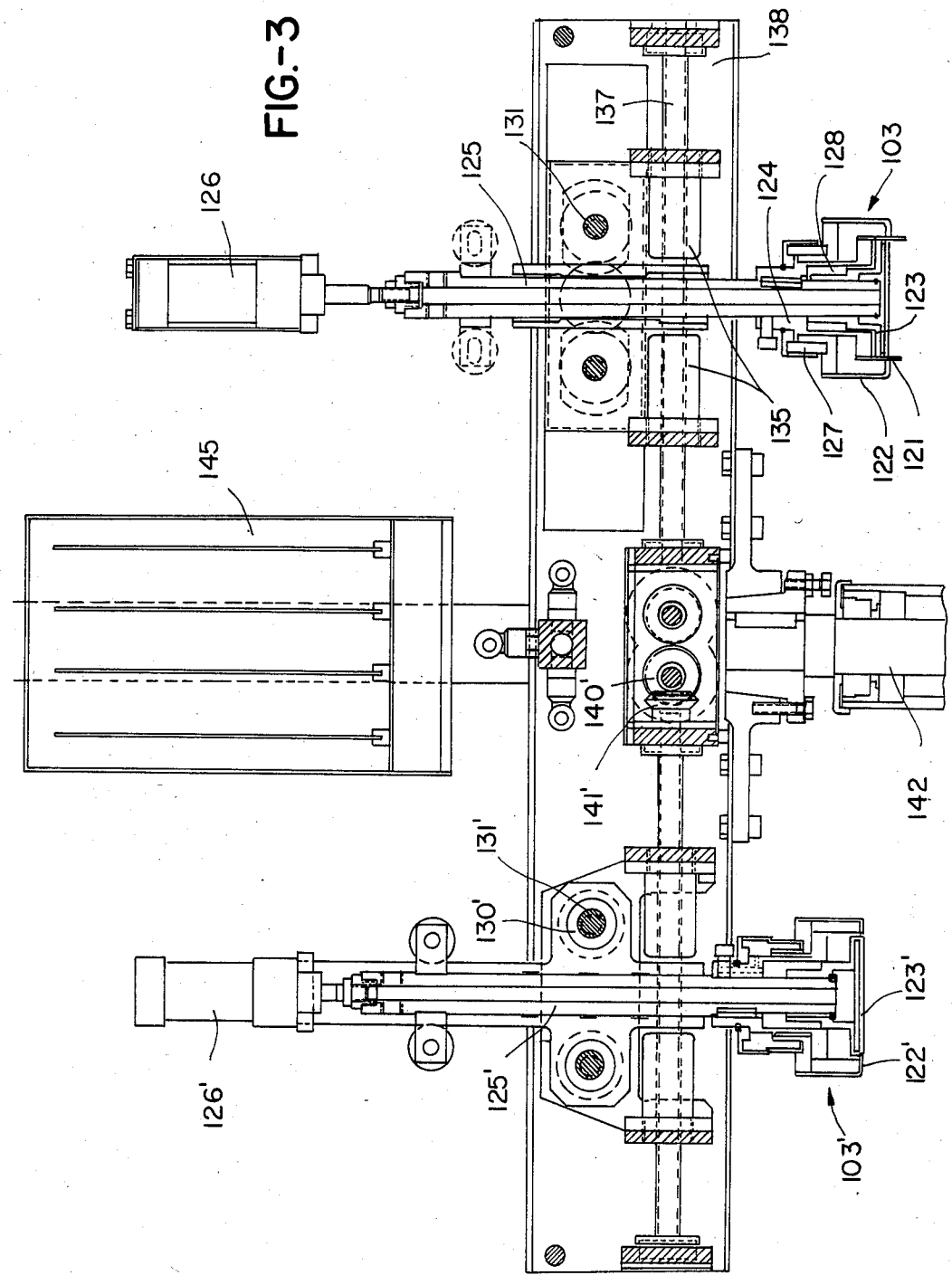
FIG. 3. Shows a side elevation view in a longitudinal cross-section of the assembly illustrated in the previous figure, a section which has been made on a level of the actual cutting heads.
Figure 4:
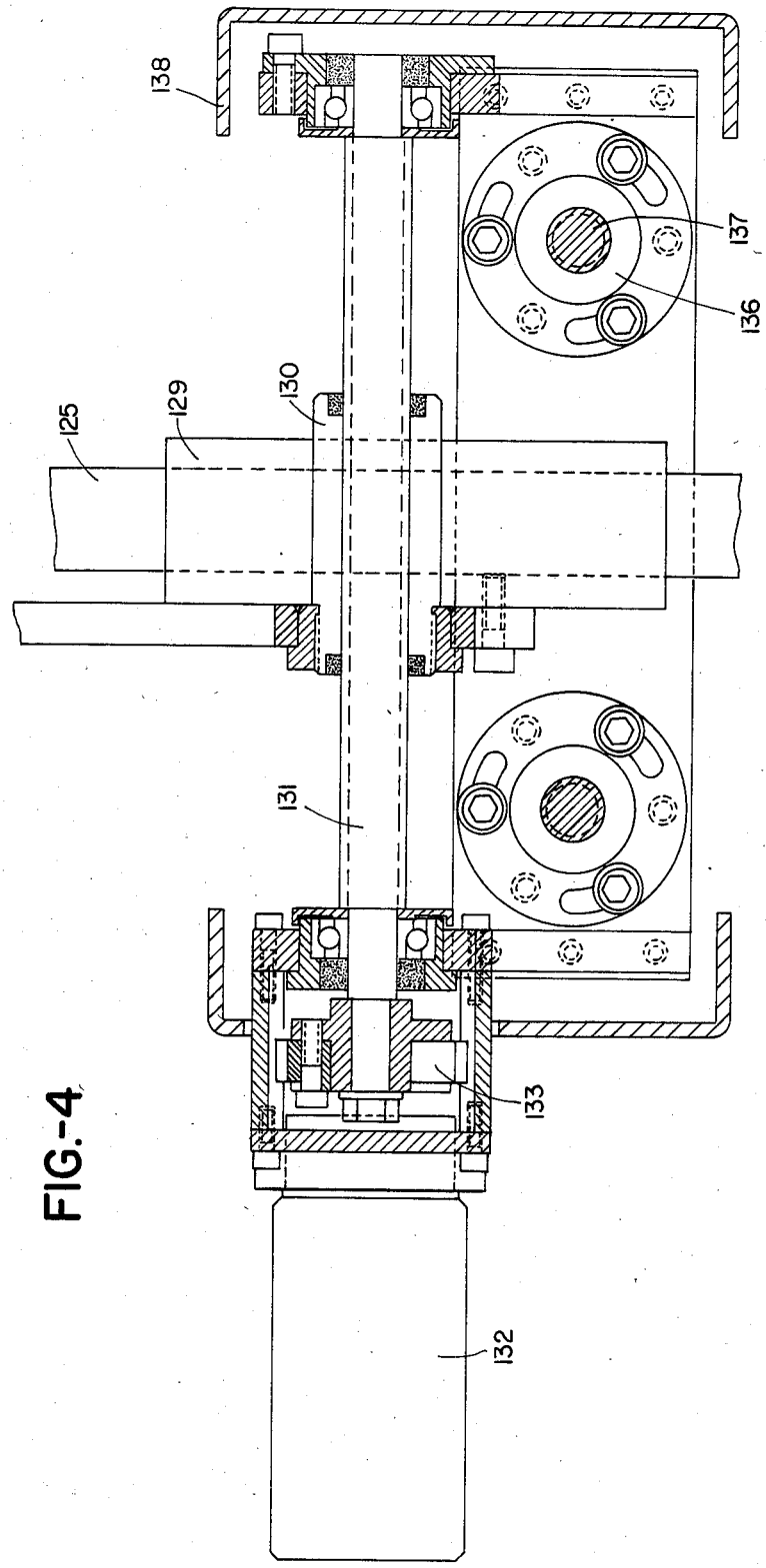
FIG. 4. Shows a cross-section of the same assembly by a perpendicular plane to the cut of the previous figure.

The cutting head 103, as shown in FIG. 3, is made up basically of a knife 121 which forms the outline of the segment to be cut on the unprepared irregular pepper part, which outline is preferably rectangular, as mentioned above, and two rammers, one rammer 122 being outside the knife 121, and another rammer 123 being inside the knife 121. Through a bushing 124, the knife 121 is associated to a shank 125, shiftable vertically through a hydraulic or pneumatic dual-effect cylinder 126. The outer rammer 122 is installed on the actual bushing 124, with springs 127 placed between, at the same time as the inner rammer 123 is installed inside the bushing 124, although through springs 128. In accordance with this layout, the springs 127 and 128 keep the rammers 121' and 123' directed outwards, as illustrated in the cutting head 103' of the left hand side of FIG. 3 and, when the cylinder 126' is driven, this assembly is projected downwards, until it reaches the unprepared pepper part placed on the tray 102. At this moment, the part is pressed by the said rammers 122 and 123, which stop on lowering, the springs 127 and 128 withdrawing, while the knife 121 continues to advance, according to the illustration of the cutting head 103 in the right hand side of FIG. 3, to diecut the part.

Now then, before the cutting head 103 starts to lower, this head 103 must be in the correct position above the respective part, whatever the position of the latter on the relevant tray 102. For this, the shank 125 of the cutting head 103 in FIG. 2 moves on a guide 129 joined to two nuts 130, capable of shifting by their respective parallel spindles 131, mounted and freely-turning, through bearings, on a common frame 131, and driven by a hydraulic or pneumatic motor 132, to whose output shaft, a pinion 133 is coupled, which meshes directly with pinions 134 integrally joined to the spindles 131. By this arrangement, the turning of the motor 132 in one direction or another causes the displacement of the nuts 130, also in one direction or another, with the consequent drag of the cutting head 103. Two pairs of nuts 135 and 136 are joined parallel to the frame 131", each of which work in respective spindles 137 installed on a frame 138 and, driven by another motor 139 to whose output shaft two bevel pinions 140 are coupled, which mesh with the respective bevel pinions 141, joined integrally to the aforementioned spindles 137, so that the movement supplied by the motor 139 to the spindles 137 leads to the displacement of the frame 131" in one direction or another, with the consequent drag of the cutting head 103.

The combined drive of the two motors 132 and 139 allows any displacement for the cutting head 103, within a plane parallel to the tray 102 and coinciding with its surface.

The frame 138, as can be seen in FIG. 3, is mounted pivot-wise on a shaft 142, so that through this shaft 142, the cutting head 103 can make a quick side movement, to reach the place where the diecut part is placed.

Figure 2:
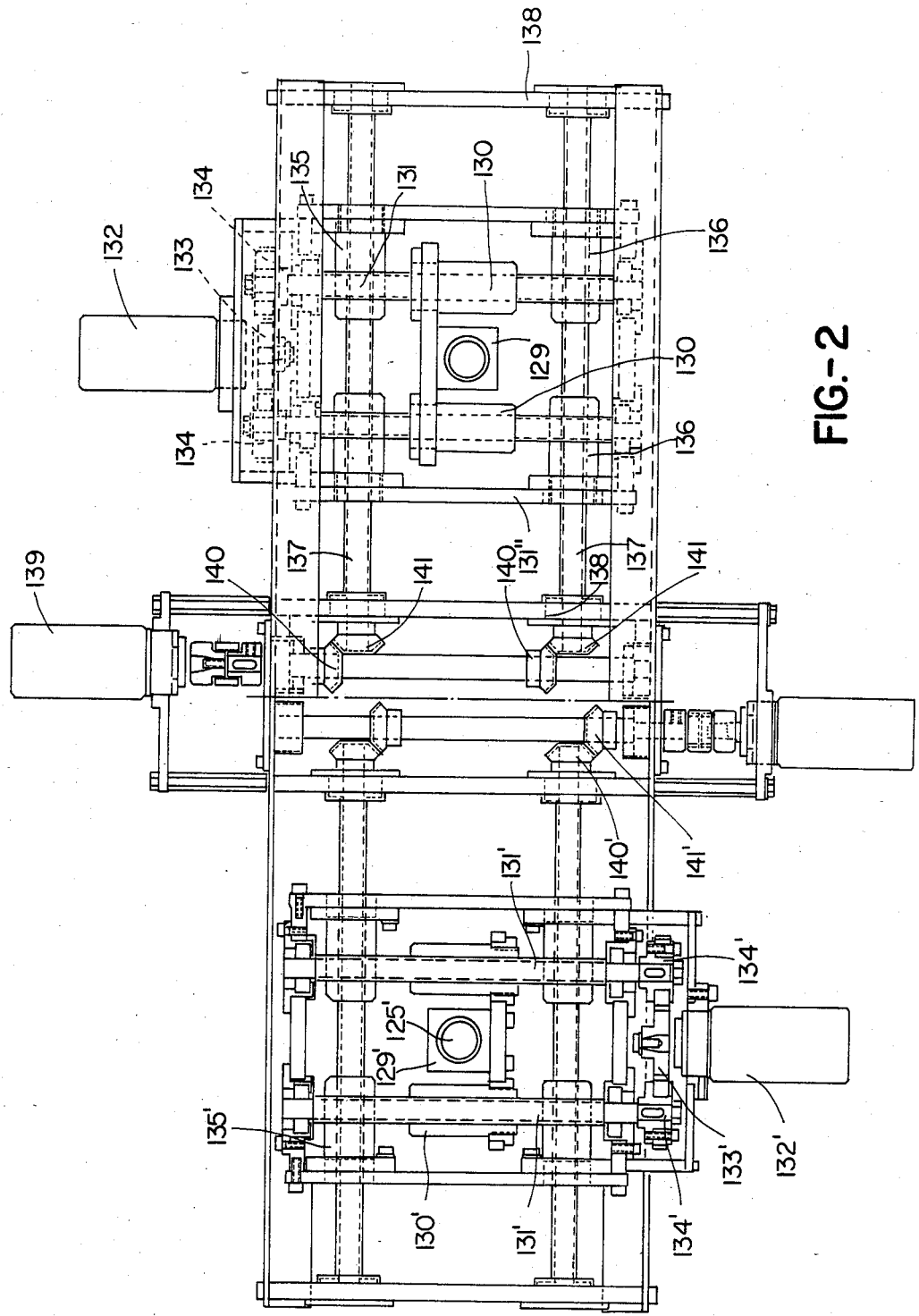
FIG. 2. Shows a plan view of a frame carrying two cutting heads, corresponding to a device for locating, selecting and cutting pepper parts, in accordance with the first operative stage of the method.

In accordance with a preferential example of this embodiment, and as mentioned above, this structure can be double, so that there are two cutting heads 103 and 103', with absolutely identical specifications; the support structure for providing them with movement is also double, as shown in FIG. 2, where the mechanisms corresponding to the second head 103' have been marked with the same numbering, but with an apostrophe.

In this way, the tilting movement of one head, for example that marked as 103, through the shaft 142, makes it move away from the tray 102 in which the diecutting has been performed, at the same time as the second head 103' approaches it, and simultaneously to the feed of that tray 102, so that the next tray 102 is in the working position, carrying another unprepared piece of pepper.

Figure 7:
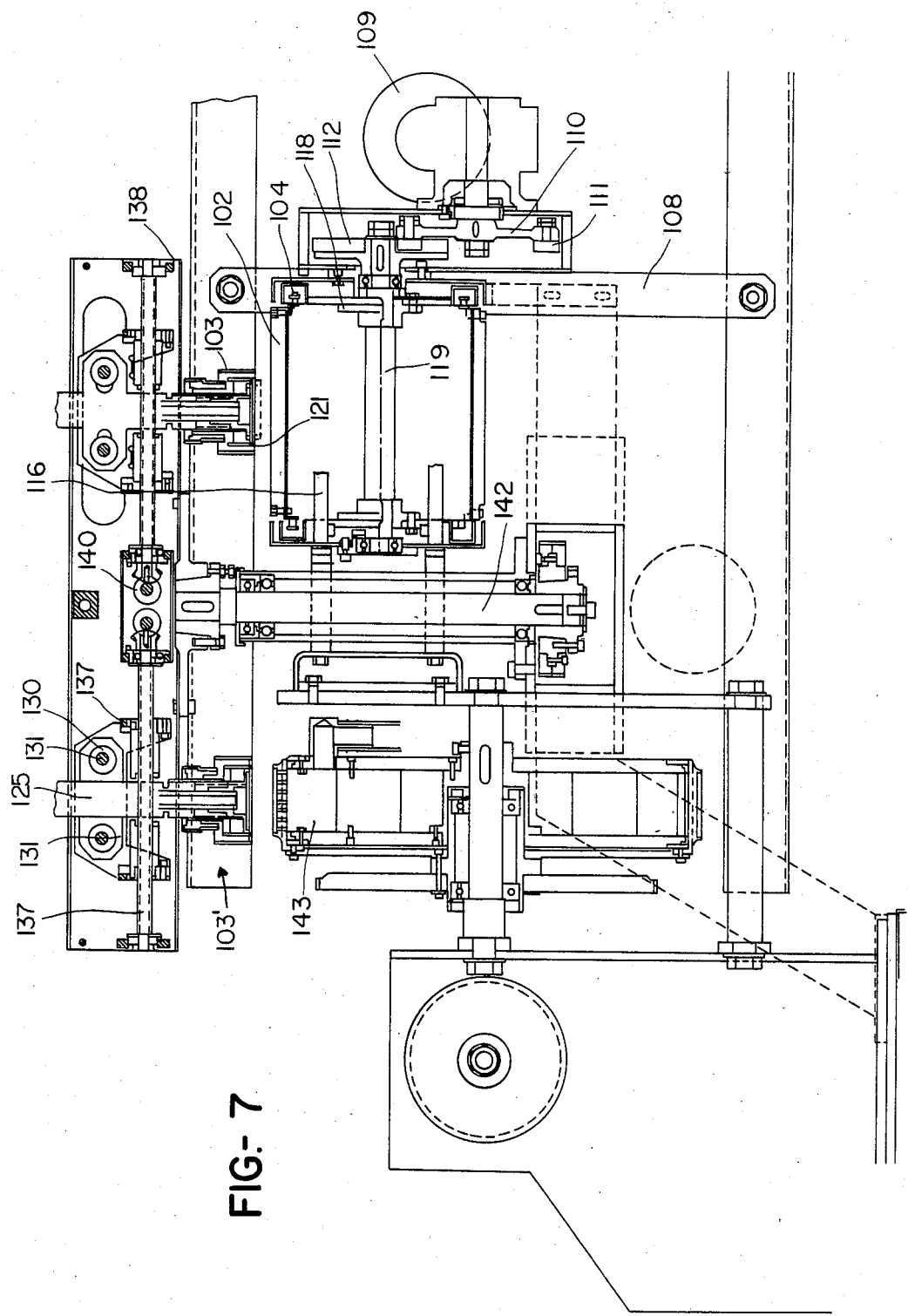
FIG. 7. Shows a similar section to that of FIG. 2, in which the heads appear interrelated with the conveyor belt and with the receiver drum of the diecut parts, corresponding to the second operative stage of the method.

To be precise, in FIG. 7, it is shown in detail how while the head 103 is above the tray 102 of the conveyor belt, the complementary head 103' is in a position to place the diecut part on the drum 143, in which the following operative stage of the machine to which the device has been coupled is to take place. Specifically, in the example illustrated in FIG. 7, this drum 143 will perform the cutting of the cut-out pepper part, in strips of identical width and length.

For the cutting head 103 to be able to drag the diecut part, it has been foreseen that the rammer 123 in FIG. 3 has perforations and through them a vacuum reaches the part which makes it adhere to the rammer 123. When the device tilts on its pivoting shaft 142, and reaches the position of head 103', i.e. the position above the area for placing the part, this vacuum supplied to it through the inner rammer 123, is converted into a pressure which makes it come away and drop.

Figure 5:
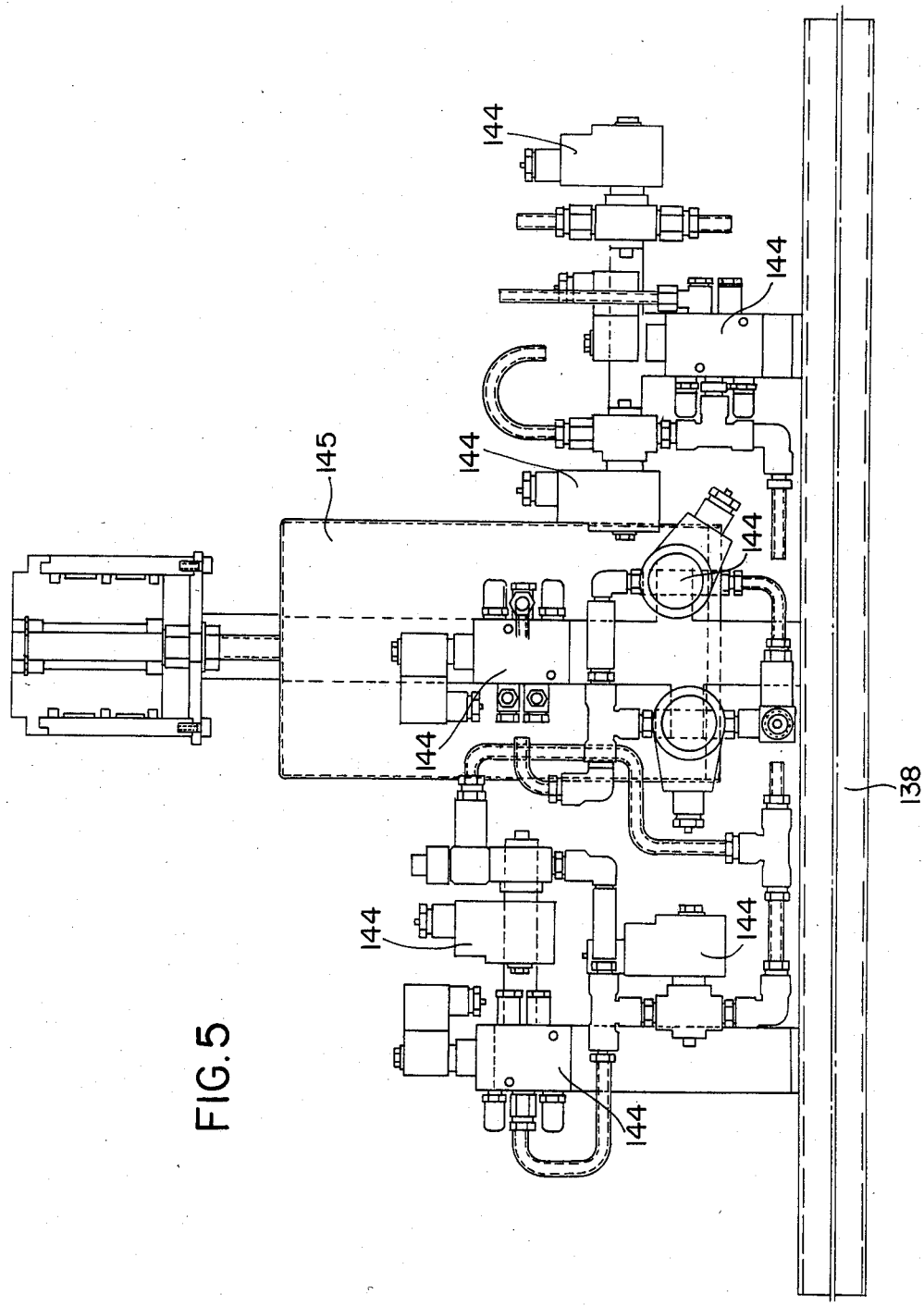
FIG. 5. Shows an example of a practical embodiment for the electrovalve assembly which controls the different hydraulic or pneumatic motors which appear in the previous figures.

The different hydraulic or pneumatic motors 132-139, together with the cylinders 126 and the pressure or vacuum sources supplied to the cutting heads 103, will be controlled by respective electrovalves 144 shown in FIG. 5 with an installation made on the actual pivoting frame 138, in accordance with the example of the embodiment illustrated in FIG. 5, or in any other way, while these electrovalves 144 will in turn be governed by the electronic circuit which will be installed in the card device 145.

The partial turns of the pivoting frame 138 can always be made in the same direction, but preferably they will be made in alternating directions, in order to avoid having distributors for the hydraulic circuits.

This first stage of the method can be performed with the installation illustrated in FIGS. 8 to 16 in which the mechanical part has been completely modified, to be able to eliminate the electronic part.

Figure 8:
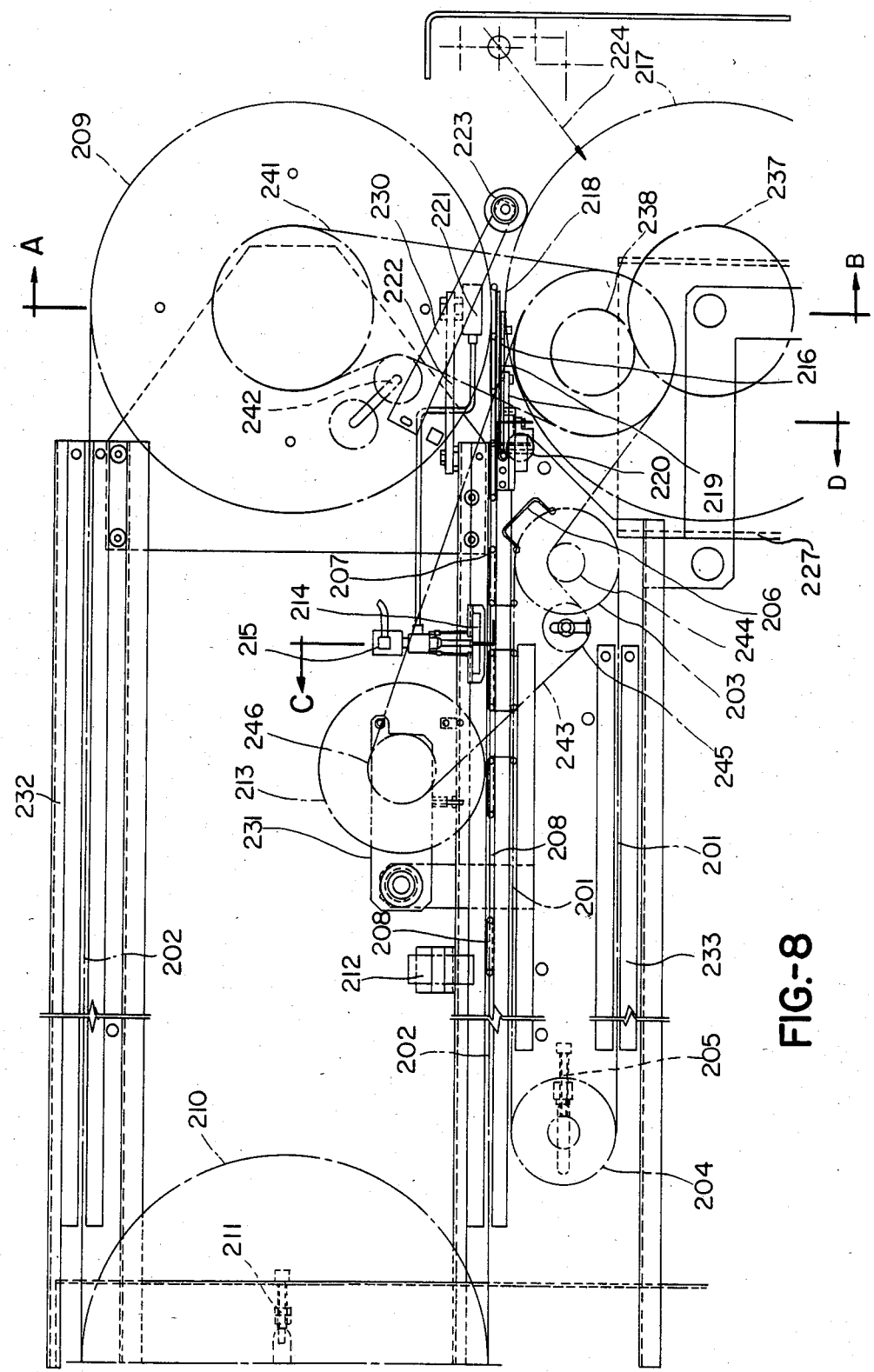
FIG. 8. Shows a side elevation view of an installation for cutting irregular shaped pepper parts, also corresponding to the first operative stage of the method, and according to an execution variation in which this installation is entirely mechanical.
Figure 9:
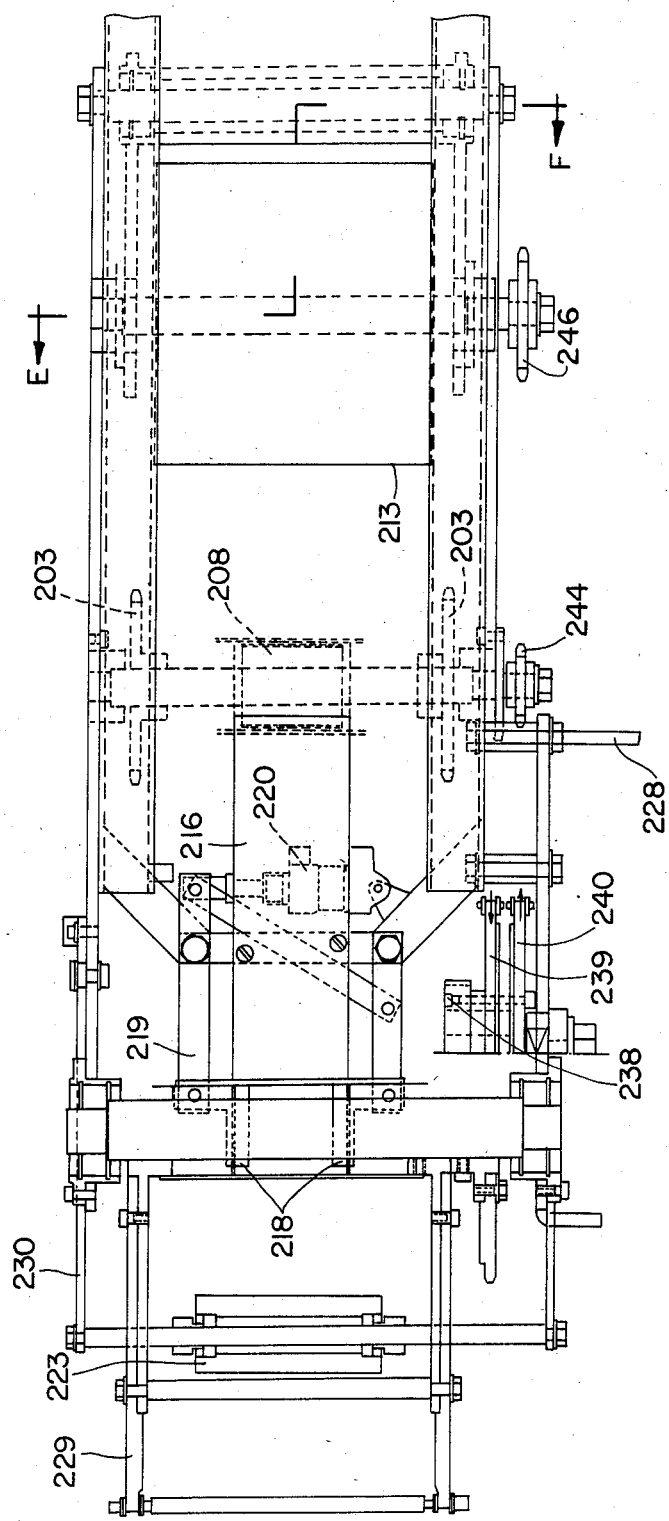
FIG. 9. Shows a plan view detail of the installation in the previous figure, corresponding to its end area, arranging the already cut parts.
Figure 10:
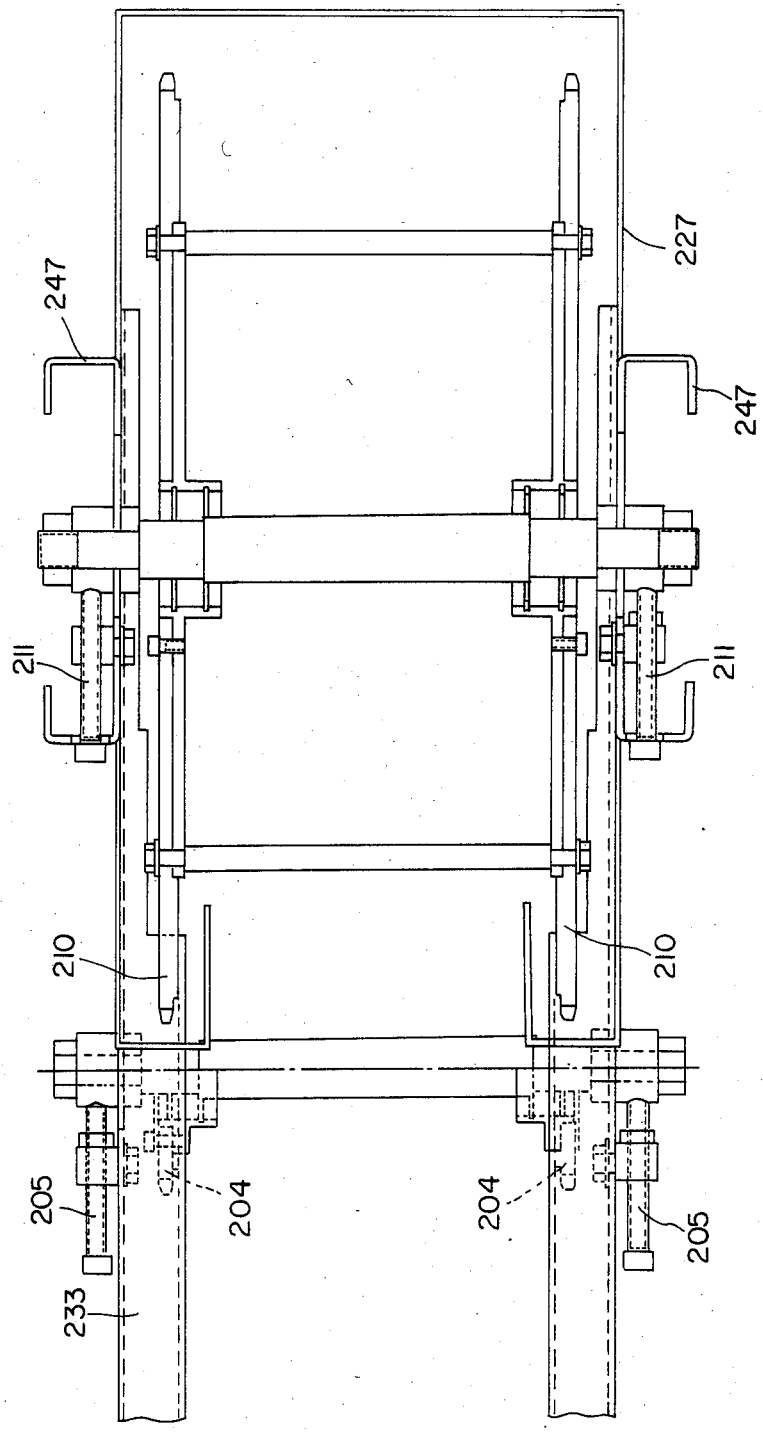
FIG. 10. Shows another plan view detail, this time of the opposite end area of the installation.

More precisely as shown in FIG. 8 in this case, the installation is made up of two chains 201 and 202, which describe respective closed cycles, which are superposed and which combine in an intermediate common horizontal stretch.

Figure 13:
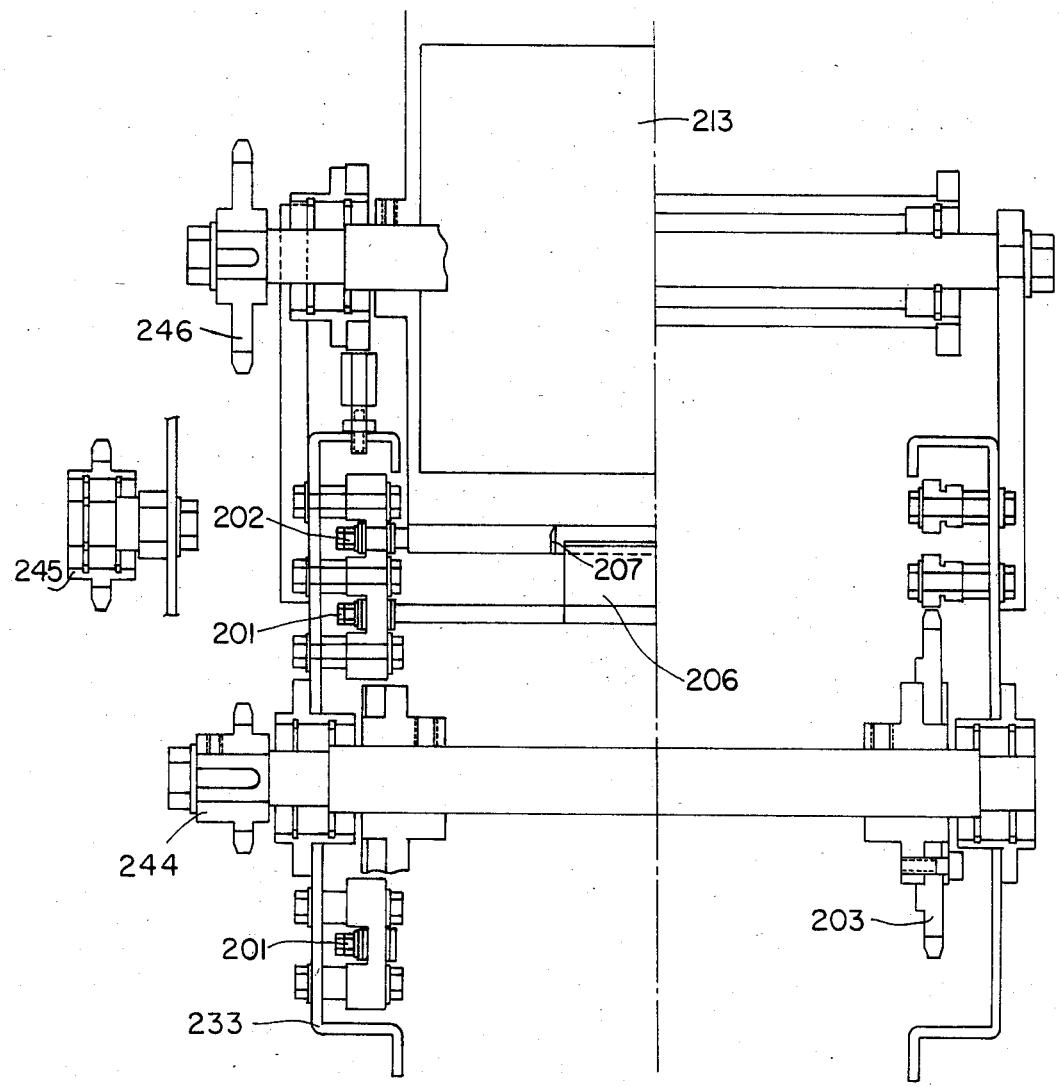
FIG. 13. Shows another cross-section of the installation, in this case according to the cutting line E-F of FIG. 9.
Figure 14:
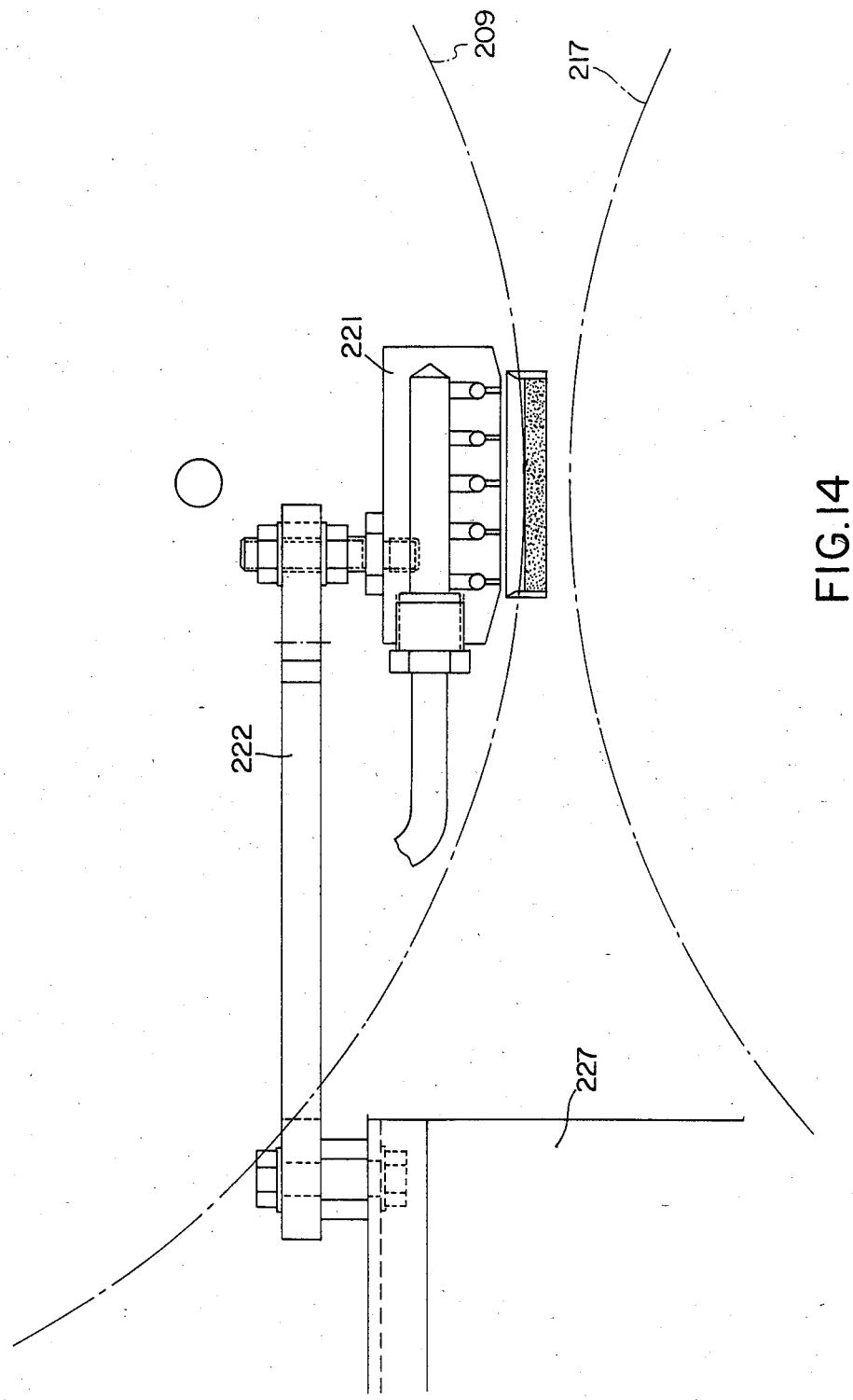
FIG. 14. Shows an elevation detail of the ejector of the pepper parts on the drum, corresponding to this same embodiment variation.

The lower chain 201, or base chain, stretches between the toothed drive wheel 203 and a return wheel 204, provided with the respective tightening device 205 and includes a plurality of parts 206, duly associated with it, evenly distributed, which can be seen in full detail in FIG. 13, and which are designed to be in combination with the cutting knives 207 corresponding to the top chain 202, or knife-holder chain, little boxes 208 on which the respective irregular shaped pepper parts will be placed by hand.

Similarly, the knife-holder chain 202 is assisted by two toothed crowns, one of the drive type 209 and the other return type 210, the latter provided with a tightening device 211.

A photoelectric cell 212 controls both chains 201 and 202 in combined forward movement, for them to be correctly synchronized with the rest of the mechanisms in the machine.

In the overall chain sector, in which the small boxes 208 appear, holding the irregular shaped parts and which, as we have said above, is of considerable length to assist feeding, there is a cutter roller 213, near its terminal area, which turns in a synchronized manner with the chains 201 and 202 and which, on contacting the knives 207 tangentially, causes the irregular pepper parts to be cut, to obtain regular pieces, with the same rectangular shape as the template defined by these knives 207.

Immediately afterwards, an ejector device 214 is placed, which through a control valve 215 supplies air under pressure to each little box 208, in which the cut has been made, eliminating the irregular perimetrical segments left over.

After removing the cuttings, and as observed in FIG. 8, the lower support chain 201 is interrupted, starting on its return run, whereas the knife-holder chain 202 continues its rectilinear horizontal path in quite a long stretch, whereby the parts 206 are separated from the knives 207, opening the little boxes 208 at the bottom. However, these boxes 208 must remain in their closed position, which is why a fixed plate 216 has been used, which is a coplanar extension with the support bases defined by the parts 206 and which closes the base of the knives 207, these little boxes 208 remaining during the end stretch of the knife-holder chain 202. This organization means that the cut-out parts can be transferred towards the upper perimetrical area of the drum 217 in which the next operation of the cutting procedure has to be performed.

The plate 216 is interrupted immediately before the depositing area on the drum 217; in this area, a pair of side blades 218 are installed, as a coplanar projection of the plate 216, which blades 218 are capable of holding and supporting the cut-out part by its edges so that this part shifts within the plane immediately above the plate 216, until it completely leaves the latter.

At this moment, the blades 218 open and the cut-out part falls onto the drum 217. For this purpose, these blades 218 are related to a pair of arms 219, hinged like scissors and driven by a small cylinder 220 arranged in a transversal position under the plate 216.

Corresponding to the pair of blades 218, on the knife-holder chain 202, a second ejector 221 is placed, also controlled through the control valve 215, supported by the bracket 222 and in charge of projecting the cut-out part against the drum 217 at the right moment.

To complement the structure disclosed, a roller 223 has been provided which, resting on the periphery of the drum 217, in turn ensures that the cut-out pepper part is perfectly adapted to the drum 217, before that part reaches the drum area, in which the knife 224 is placed, with which the part is cut transversally in strips.

Figure 15:
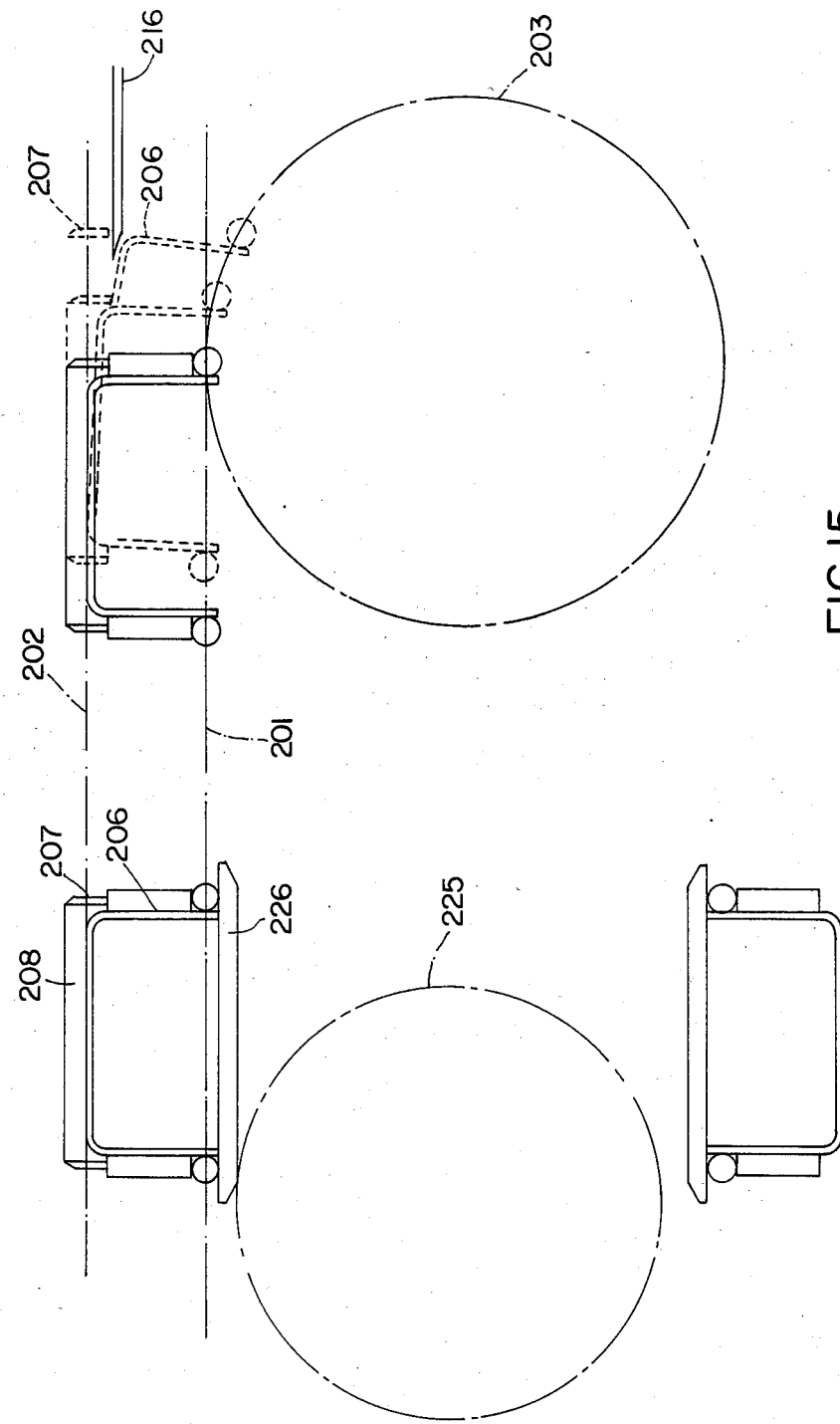
FIG. 15. Shows an enlarged detail, in an elevation view, of the base chain, in its independent area with respect to the knife-holder chain, and in which the plate also appears which assists in withholding the parts.
Figure 16:
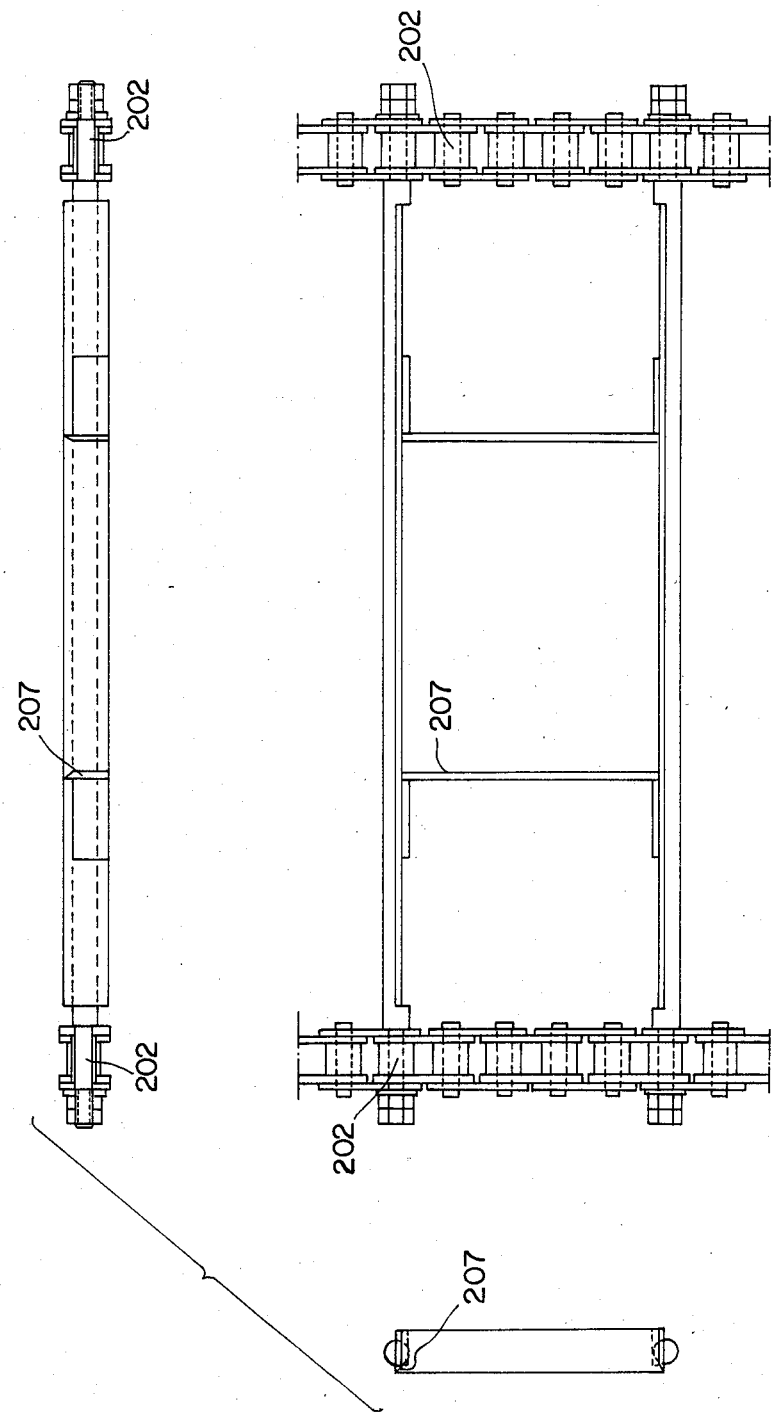
FIG. 16. Shows a plan view detail, elevation view and profile of the knife-holder chain.

The fact should also be mentioned that, in order to avoid the pressure supplied by the cutting roller 213 being applied on the chains 201 and 202, a preferably nylon roller 225 shown in FIG. 15 has been provided under the base chain 201, corresponding with the cutting area, on which roller the parts 206 rest, through their lower platform 226, the moment the cut takes place.

Obviously, all these elements are installed as shown in FIG. 8 on a bedframe 227, on which the drum 217 is also mounted, with the assistance of the bracket 228 (FIGS. 8 and 11); there is a bracket 229 (FIG. 9) for the tooth crown 209 (FIG. 8), tilting arms 230, the roller 223, a bracket 231 for the cutter roller 213 and covering housings 232 also being fixed to the structure, for the return of the cutting chain 202, as also covering housing 233 for the return of the base chain 201.

Figure 11:
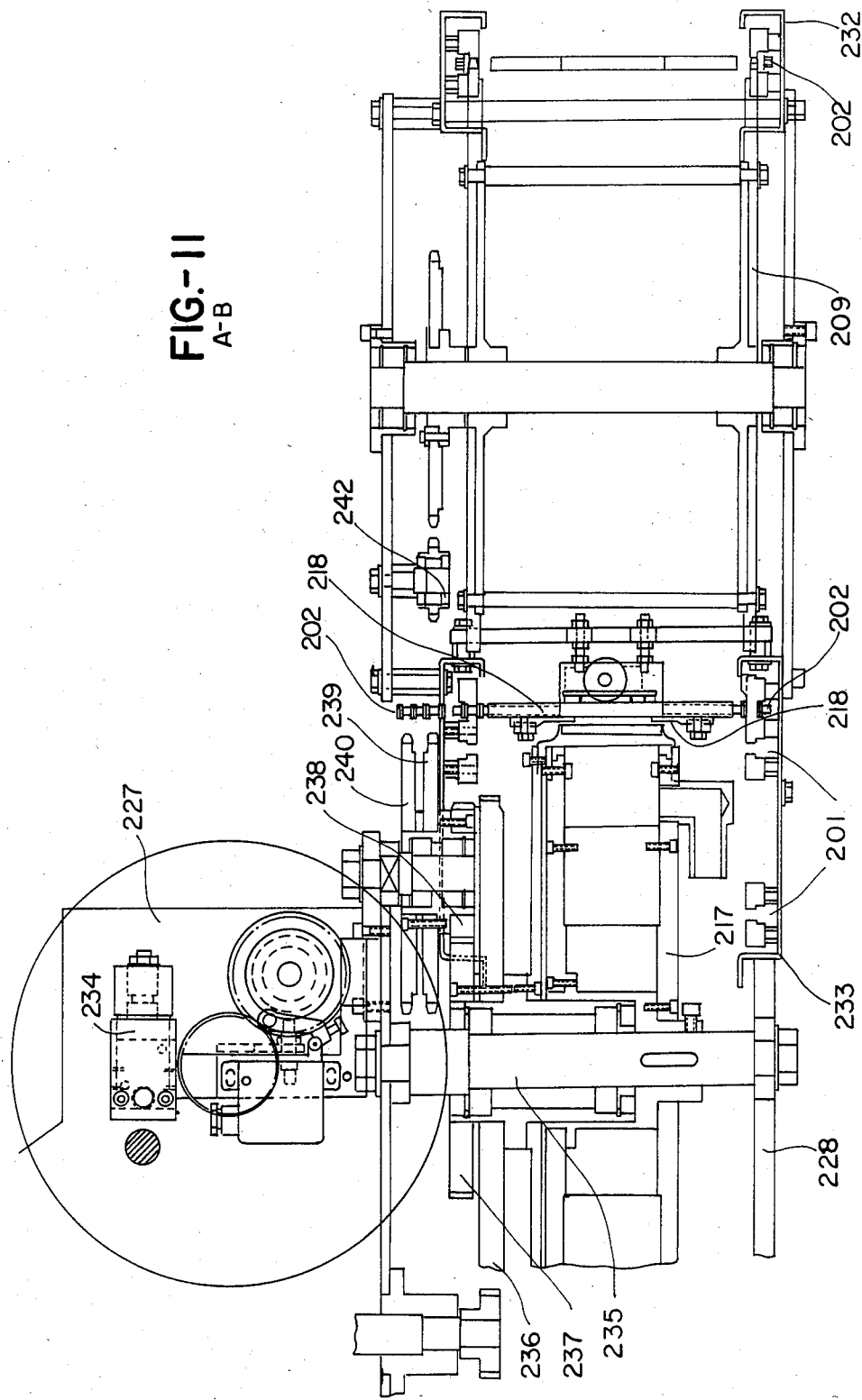
FIG. 11. Shows a cross-section profile of the same installation, made on a level of the drive shaft of the cutting chain, according to the A-B line of FIG. 8.
Figure 12:
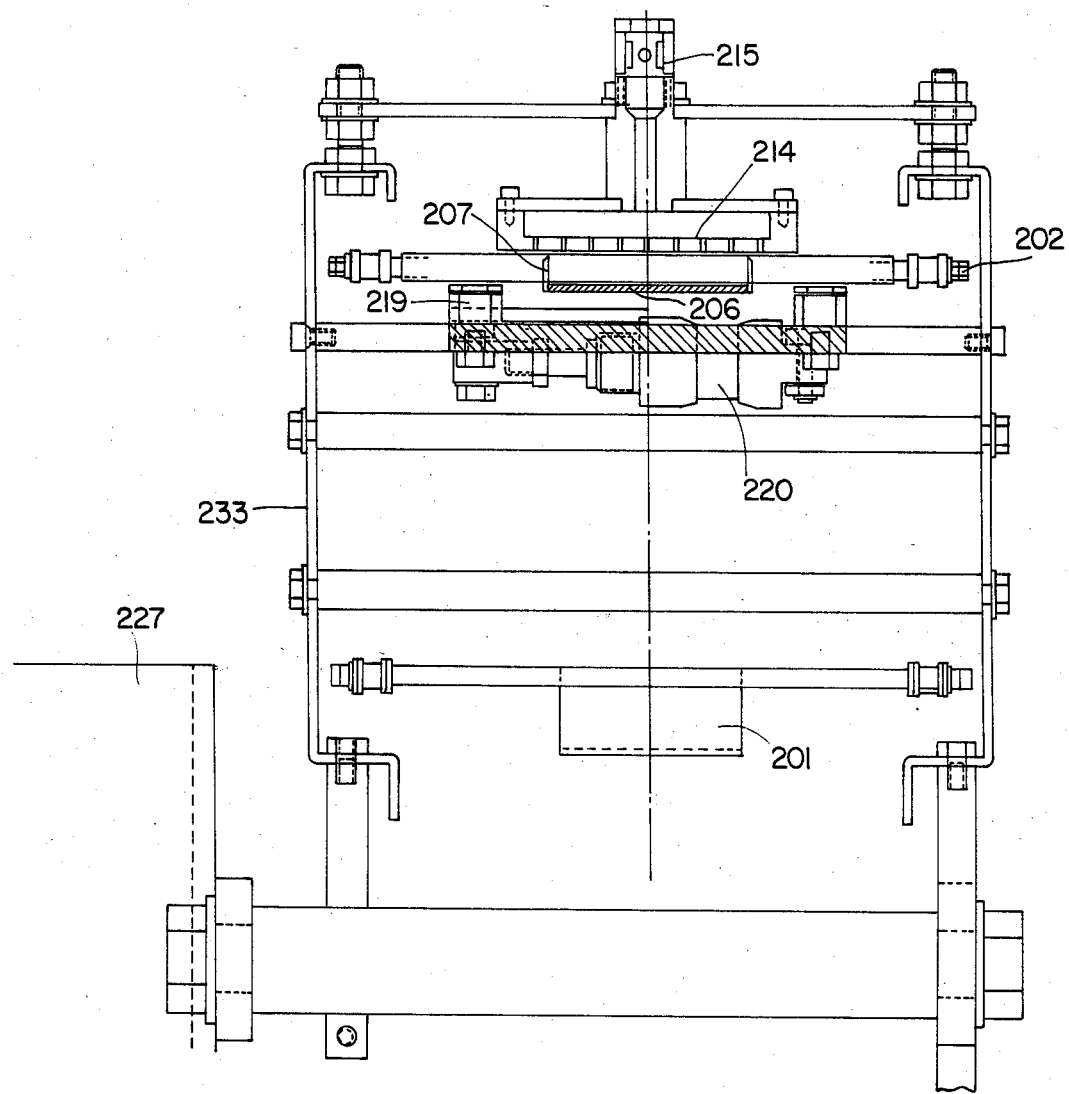
FIG. 12. Shows another cross-section, this time according to the C-D-cutting line of FIG. 8, made on a level of the ejector of the cuttings.

As shown in FIG. 11, the valve 234 is mounted in the bedframe 227, to control the cylinder 220 (FIG. 8) which acts on the blades 218 of the clip.

From the drive point of view in FIG. 11, and from the shaft 235 corresponding to the drum 217, which receives the movement through the crown 236, a toothed wheel 237, integrally joined to said shaft 235, transmits the movement to a pinion 238, to whose shaft two crowns are joined, one crown for the upper chain 202 and another crown 240 for the lower chain 201. The transmissions 241 for the toothed crown 209 corresponds to the top chain 202 with its tightening device 242, whereas the transmission 243 (FIG. 8) for the bottom chain 201 acts on a pinion 244 joined to the actual shaft of the drive wheel 203; at the same time, with the interposing of the tightening device 245, this same transmission 243 activates the cutting roller 213, through the pinion 246.

Due to the extraordinary length of the chains 201 and 202, it has been foreseen that, apart from the bedframe 227, a pair of legs 247 (FIG. 10), arranged on the opposite end, should assist as support elements for the whole assembly.

Thus, in accordance with the arrangement disclosed in FIG. 8, on the middle horizontal line of the double chain and specifically on the little boxes 208, the different pieces of pepper or regular shaped pepper parts concerned are placed sequentially by hand. As each box 208 passes under the cutting roller 213, by the pressure which the latter supplies to the double chain, the part is cut, with the assistance of the lower roller 225 (FIG. 15), acting as a dolly. Next, the ejector 214 (FIG. 8) eliminates the surplus cuttings, so that only the perfectly rectangular pieces of pepper remain on the chain, in keeping with the die formed by the cutting knives 207.

Then, the lower or support chain 201 returns to enable the drum 217 to be rotated, while the knife-holder chain 202 continues until it reaches the top area of that drum 217; the pieces of pepper remain in the boxes 208, as at the same time as they become independent of the parts 206 corresponding to the base chain 201, these boxes 208 are closed by the complementary fixed plate 216.

In the end area of the plate 216, corresponding to placing the parts of pepper onto the drum 217, the clip, with its blades 218 closed, keeps the box 208 partially closed, shutting the sides of the base corresponding to the cutting knife 207 and keeping the piece of pepper in a suspended position until it completely leaves the plate 216.

At this moment, the valve 234 (FIG. 11) activates the cylinder 220 (FIG. 8), whereby the side blade 218 opens and the piece of pepper drops onto the drum 217; the second ejector 221 assists in this dropping action, which means that it takes place instantaneously and perfectly synchronized with the movement of the drum 217, irrespective of the weight of the part, which varies according to its thickness.

Finally, the roller 223 ensures that each piece of pepper is perfectly adapted to its place in the drum 217, before that piece reaching the knife 224, with which it is chopped to obtain strips.

Figure 18:
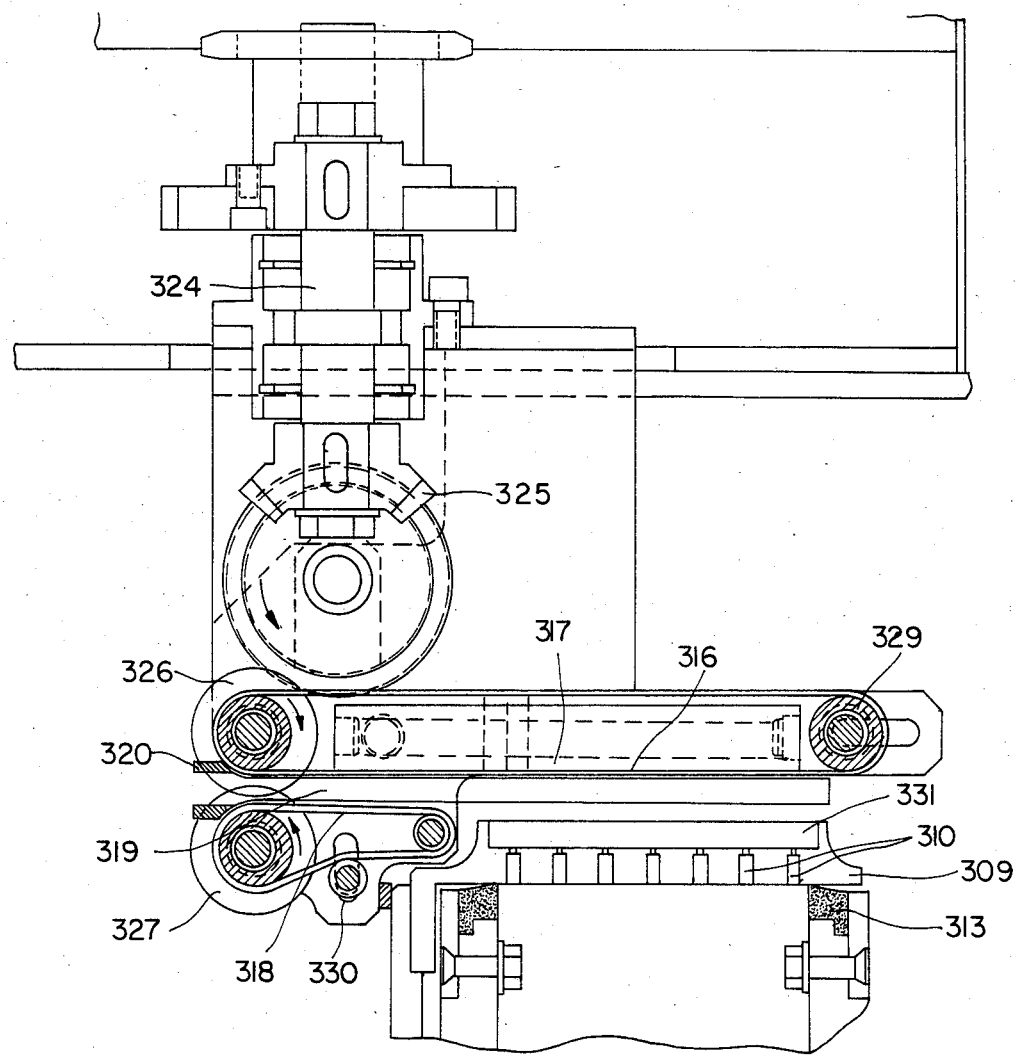
FIG. 18. Shows a partial detail in a diametrical section of the drum, from which the conveyor belts can be seen on leaving, and the drive devices for these belts.

For the second stage of the method, a structure like that shown in FIGS. 17 and 18 is used, made up of a drum (unnumbered), which corresponds to the drum 8 in the diagram of the method, the drum 143 in the first practical solution for the first operative stage of the method, and the drum 217 for the second practical embodiment, shown in FIGS. 8 to 16. This drum comprises a cylinder 301, suitably stiffened to a support chassis 302; this cylinder 301 includes a plurality of radial arms 303, identical in length and irregularly distributed, which, with the assistance of side plates, form hollows aligned perimetrically, numbered 304, 305, 306, 307 and 308.

A cylindrical ring 309 is installed on this assembly, which transforms these hollows 304–308 into chambers and which, through the relevant synchronizing drive devices with the rest of the drive elements of the machine, give this ring 309 a rotating movement at the right speed.

The ring 309 includes a plurality of drilled holes 310, which form transversal alignments, with the particularity that these alignments are spaced at a distance between each other which preferably coincide with the width of the strips to be obtained from the pieces or slices 311 which are supplied to the drum, or a submultiple of that width.

The ring 309 rests on the arms 303 of the fixed cylinder 301, through sealing joints 312, at the same time as this ring 309 rests on the side plates of the cylinder 301 through annular joints 313 (FIG. 18) which, obviously, seal the different hollow chambers 304 to 308 at the side.

The chamber 304 shown in FIG. 17 is connected to a vacuum source, so that when the rectangular slice of material 311 is placed on the initial area of that chamber 304, it adheres to the ring 309 by the suction which is produced through the holes 310. At a point of the drum corresponding to this chamber 304, a cutting knife 314 cuts the cylindrical ring 309 radially and tranversally, cutting the slice 311 into strips, with a width which will depend on the actual speed of the ring 309 and of the speed corresponding to the alternating movement of the knife 314. Although a given practical solution showing how the knife 313 works has been illustrated in FIG. 17, it is obvious that this structure is given merely by way of example and that it can be replaced by any other appropriate example.

After the chamber 304 and in the actual body of the radial arms 303', a groove 315 is made, to instantaneously supply pressure to each transversal alignment of holes 310, the moment these holes 310 come opposite the groove 315, whereby the adhering effect of the strips 311', made by the cutting knife 314, is converted into an ejecting effect; thus, these strips 311 are cast against a conveyor belt 316, provided with a vacuum, so that these strips 311 adhere to its surface, against the force of gravity.

The conveyor belt 316, as seen in FIG. 18, is arranged, with respect to the cylindrical ring 309, in a direction parallel to its generatrix, stretching beyond that ring 309, where a second belt 318 assists it, so that between both belts 316 and 318, a path 319 is established for the strip of product, in which this strip rests on both belts 316 and 318 on opposite sides. The belts 316 and 318 lead to a guide 320, through which the strips of material are taken to the shaper and supply device of the tops.

The chamber 305 of FIG. 17 in the drum is inoperative, and instantaneous pressure is established between the groove 315 and the chamber 306, designed for washing the cylindrical ring 309, to which pressurized water obviously flows, to remove the waste which could have stuck to that ring 309, especially when the product is not very consistent, as in the case of natural pepper. After chamber 306, a drying chamber 307 is established, by pressurized air, chamber 308 also being inoperative.

A tray 321 is placed in the area under the drum, to collect the washing water.

Special mention should be made of the fact that the transversal sealing joints 312 are double for each arm 303, forming a groove 322 and a hole 323 between them, communicating with the outside, so that, in the event of possible slight leakage in one of the chambers 304–308, this leakage does not affect the adjacent chambers, but the pressure, negative pressure, or water in such chamber leaves through these holes 323.

As shown in FIG. 18, a drive shaft 324 has been provided for driving the conveyor belts 316 and 318, which, through a set of bevel pinions 325, transmits the movement to a toothed wheel 326, placed in one of the ends of the belt 316; this toothed wheel 326 meshes with wheel 327, which is also toothed, integrally joined to the drive shaft 324 of the belt 318. This solution is merely an example, and can be varied without any limitation whatever.

There is a tightener roller 329 in the other end of the belt 316, while the tightening of the belt 318 is performed by means of a side deflector 330.

In order to ensure a perfect cut by the knife 314 of FIG. 17, the rotating ring 309 has been designed to include a plurality of transversal grooves 331, spaced in keeping with the width foreseen for the strips 311 to be obtained, and which the cutting edge of the knife 314 reaches, substantially exceeding the thickness of the pepper part 311 to be chopped.

From the embodiment disclosed, it can be deduced that the rectangular pieces or slices of the product concerned in FIG. 1, will be placed on the top area of the drum, by any method, being adhered to the cylindrical ring 309 of FIG. 17 by the negative pressure supplied to the chamber 304. These slices 311 will be supplied with a rate so that they touch each other at the sides, forming a perfect continuity in the drum surface. The cutting knife 314, while the drum rotates, causes these slices 311 to be cut into strips 311' of the desired thickness, which remain adhered to the ring 309 due to the negative pressure, while the ring 309 is opposite the chamber 304 and which, when they reach the groove 315, are cast, by pressure, against the conveyor belt 316. The speed of this belt 316 will be such that at the end of dragging a given strip 311', it receives the next strip 311', establishing perfect continuity between them, which is possible thanks to all the strips 311' being of the same length, as they are obtained from slices 311 of the same width. To begin with, the strips 311' adhere to the belt 316 of FIG. 18 through the negative pressure existing inside it, whereas the final supply stage to the shaper device of the tops takes place with the assistance of the second belt 318.

After the cylindrical ring 309 has passed the ejection area formed by the groove 315, it is subjected to a washing process, corresponding to chamber 306, and to a subsequent drying process on passing opposite chamber 307. The water and the waste eliminated from the cylindrical ring 309, drop through the tray 321.

The operating mechanism for the cutting knife 314 shown in FIG. 17 receives movement through the pinion 340, by means of an appropriate drive, to establish due synchronization between the speed of the drum 301 and each stroke of the knife 314, in order to cut the different strips of pepper into pieces with predetermined widths.

The pinion 340 is attached to a shaft 341, intergral with another pinion 342, which meshes with a bevel pinion 343. This bevel pinion 343 is associated with a shaft 344, which is slanted in relationship to the shaft 341 and is parallel to the tangent of the drum 301 at the point of incidence of the cutting knife 314 thereon. This shaft 344, which is mounted on a corresponding support 345, incorporates a plate 346 to which there is pivoted an arm 347 that directly supports the cutting knife 314. This arm 347 is, in turn, pivoted to a rod 348, which tilts on the support 345, so that the turning movement of the shaft 344 is transformed into a reciprocating movement of the cutting knife 314, in the sense of incidence and deviation with respect to the periphery of the drum 301.

This representation is, however, only one example of a suitable operating mechanism for the cutting knife 314. There are numerous other solutions which create the same effect on the cutting knife 314. These solutions are not only of a mechanical nature but also may be of a pneumatic or hydraulic nature, since the knife 314 may be associated with the shank of any reciprocating rod whose operation may be properly synchronized to the angular movements of the drum 301 between two cuts on different strips of pepper.

Figure 19:
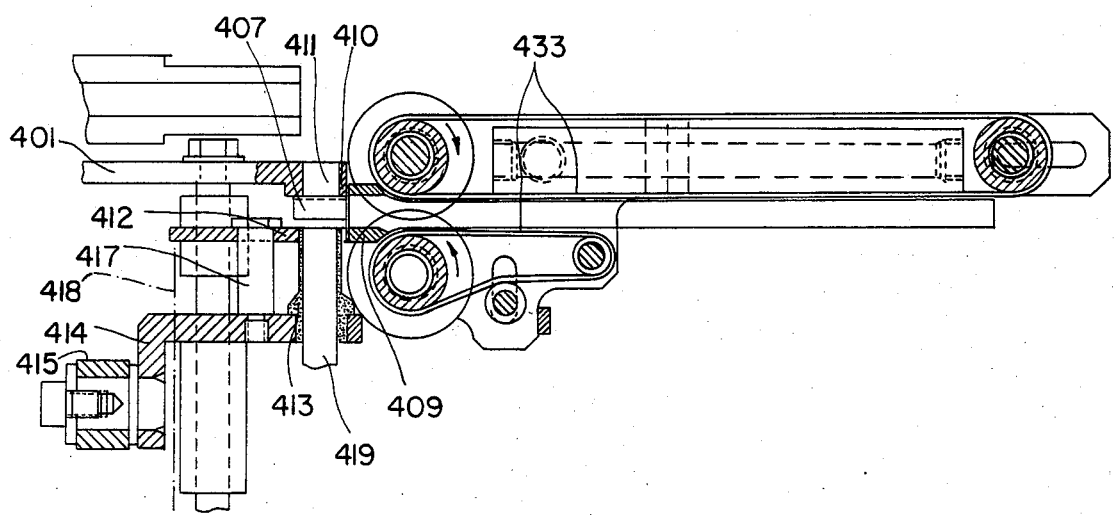
FIG. 19. Shows a partial detail of the installation corresponding to the third operative stage of the method, that of finally shaping the tops and supplying them to the fruit, according to a diametrical cut and on the level of its peripherical area, in which the receiver and cutter housings of the different pieces of product are made; the housing corresponding to the cross-section appears empty, in a position opposite the aforementioned suppliers of said product.

Finally, to put the third and last stage of the method into practice, an installation like that shown in FIGS. 19 to 21 has been foreseen, comprising a disk 401, which in accordance with the example of the embodiment chosen, which in the assembly is designed for supplying pepper tops to olives stuffed with paste, is integrally joined to the disk 402 of FIGS. 20 and 21, which supplies this paste, which can be made of anchovy, pepper or any other material.

This double disk 401 and 402 is joined to a shaft 403 (FIG. 21 only) which turns through bearings 404 on the respective support chassis, driven by a dully synchronized rotating movement with the drum of the pitting machine 405.

As can be seen in FIG. 21, the shaft 403 for the disk 401 is parallel to the shaft 406 of the machine 405.

A plurality of housings 407 (FIG. 19 only) are made in the periphery of the disk 401, coinciding numerically with the number of pitting units 408 (FIG. 21 only) in the periphery of the machine 405, with which they have to be functionally combined.

Each housing 407 (FIG. 19 only) of the disk 401, to which the continous strip of pepper goes through the guide 409, is assisted by a knife 410, which partially and transversally affects its mouth, so that after the end part of the strip has been inserted in that housing 407, it is immediately cut.

The actual turning of the disk 401 makes the sector of pepper thus obtained move towards the housing 407 blocked by the knife 410, an area in which a drill 411 is made whose axis is parallel to the shaft 403 (FIG. 21 only) of the actual disk 401. Obviously, quadrangular sectors are obtained from a continuous strip, due to the cutting effect of the knives 410 (FIG. 19 only), which coincide dimensionally with the width of the strip and with the bottom of the housing 407; a rammer 412 assists with each of these housings 407, associated with a cutting knife 413, which is joined integrally to an arm 414 finished in a roller 415, through which an eccentric 416 (FIGS. 20 and 21) causes its axial displacement, consequently pressing the individual sector of pepper on the opening of the drill 411, through the rammer 412, which the moment it contacts the pepper interrupts its movement, sliding on the guide shank 417 (FIGS. 19 and 20), against a weak spring 418, while the knife 413 continues to advance to obtain the diecutting of the sector of strip of product and the definite shaping of the top.

A shank 419, displaceable axially inside the hollow cutting knife 413, associated to an arm 420 (FIGS. 20 and 21), holding a roller 421 on which a second eccentric 422 (FIG. 20 only) works, whose diameter coincides with that of the actual drill 411, drags the pepper top, already shaped to be transferred inside the drill 411.

The disk 401 is aligned with respect to the pitting machine 405, so that at a given moment, each hole 411 of the disk 401 is coaxial with the drill 423 in a disk 424 which the pitting machine 405 has, and through which the top is taken, and if necessary, the filling, to supply it to the olive 425.

At the moment of the coaxial coupling of the respective drills 411 and 423, of both disks 401 and 424, the shank 419 is subjected to greater axial displacement, in the direction of the arrow shown in the center of FIG. 20, through the effect of its second eccentric 422, whereby the top 426 is transferred inside the hollow drill 423 of the disk 424, as can also be seen in FIG. 20.

In the case that the olive 425 also has to contain stuffing material, which is supplied by the disk 402, one of the multiple radial injectors existing in it, at the moment of coaxial coupling between the hollow drills 411 and 423, provoke the radial ejection of a mass of paste 427, as illustrated with the central arrow in FIG. 20, which paste enters the hollow drill 423 through a radial window of the disk 424.

Hence, the top 426 and the paste 427, which prior to the interaction between the disks 401-2 and 424 were in disk 401 and disk 402 respectively, instantaneously pass to disk 424 of the machine, so that a pusher 428, corresponding to pitting unit 408 (FIG. 21 only), immediately causes its general axial displacement towards the inside of the cutting nozzle 429, of the machine which in turn will be dragged by the pusher shank 430 (FIG. 20 only), until it makes contact with the mouth of the previously pitted olive 425 held between seats 431 and 432.

The supply of the continuous strip of pepper, or whatever material is concerned, can take place through a pair of conveyor belts 433 (FIG. 21 only), and with a feed drum 434, or by any other method.

From the organization disclosed, it can be deduced that the installation can be intended, as stated hereinabove, for the supply of pepper tops to stuffed olives, or to any other type of top intended to block the opening in any fruit after the removal of its stone, merely by varying the configuration and dimensions of the different elements making it up, in accordance with the needs of each case. Likewise, in the specific case of olives, the installation can be applied to pitting machines of other types, after duly adapting its ejector means to the receiver means of that machine.

I claim:

1. A machine for supplying tops to be used to close pitted fruit comprising:
   a first conveyor belt means for receiving an irregularly shaped first piece of food on a tray;
   a viewer means, positioned over the first conveyor belt means, for detecting the size and position of the first piece of food;
   an electronic circuit means, operatively connected to the viewer means, for analyzing information on the position of the first piece of food for the purpose of allowing the piece of food to be die-cut;
   a first head means, arranged on one end of an arm and positioned over the first conveyor belt means, for die-cutting the first piece of food on the tray into a first segment and for thereafter transferring the first segment away from the first conveyor belt means;
   first drum means, positioned near to the first head means, for receiving the first segment from the first head means and, after the first segment is cut into strips, for transferring the strips away;
   first knife means, positioned on the first drum means, for cutting the first segment into strips;
   whereby the strips are to be used as tops to close pitted fruit.

2. The machine, according to claim 1, further comprising:
   a first motor means for driving the first conveyor belt means.

3. The machine, according to claim 1, further comprising:
   bracket means, positioned under the tray of the first conveyor belt means, for receiving part of an impact of the first head means on the tray when the first head means die-cuts the first piece of food on the tray.

4. The machine, according to claim 1, further comprising:
   a die-cutter positioned in the head means and shaped into an outline of the first segment cut from the first piece of food; and
   two rammer means, one provided outside and the other inside a periphery of the die-cutter, for assisting the die-cutter in cutting the first piece of food into the first segment.

5. The machine according to claim 1, further comprising:
   second motor means, operatively connected to the first head means, for imparting to the first head means transverse and longitudinal movement relative to the first conveyor belt means so that consequent combined movement of the first head means results.

6. The machine, according to claim 5, further comprising:
   electrovalve means, operatively connected to the electronic circuit means, for controlling the second motor means.

7. The machine, according to claim 1, further comprising:
   a second head means, arranged on an opposite end of the arm from the first head means, for die-cutting a second piece of food on a second tray on the first conveyor belt means into a second segment;
   wherein said second head means and said first head means are moved by the arm so as to alternatively die-cut the first and second pieces of food into the first and second segments, respectively, and to transfer said first and second segments from the first conveyor belt means to the first drum means.

8. The machine, according to claim 1, wherein:
   said first drum means includes clip means for holding the first segment by the side edges thereof before and during the cutting of the first segment into strips by the first knife means.

9. The machine, according to claim 1, wherein:
   said first conveyor belt means includes a lower conveyor chain having a plurality of support parts and an upper conveyor chain having a plurality of knives so that a combination of the support parts and the knives forms a box which holds the irregularly shaped first piece of food.

10. The machine, according to claim 9, further comprising:
    a fixed plate means, arranged to be coplanar with the lower conveyor chain, for keeping a bottom part of the box closed.

11. The machine, according to claim 9, further comprising:
    roller means, supported on the upper conveyor chain, for cutting off a peripheral area of the irregularly shaped first piece of food; and
    an ejector nozzle means, positioned immediately after the roller means on the upper conveyor chain, for eliminating the peripheral area cut off the irregularly shaped first piece of food.

12. The machine, according to claim 11, further comprising:
    drive means, operatively connected to the lower conveyor chain, for transmitting movement simultaneously to the lower conveyor chain and the cutting roller means.

13. The machine, according to claim 11, further comprising:
    a dolly roller means, positioned under the lower conveyor chain, for absorbing an impact of the cutting roller means when the cutting roller means cuts off the peripheral area of the irregularly shaped first piece of food.

14. The machine, according to claim 1, further comprising:
    a second conveyor belt means, positioned adjacent to the first drum means, for receiving and transferring the strips;
    a third conveyor belt means, arranged substantially parallel to the second conveyor belt means, for assisting the second conveyor belt means in transferring the strips; and
    a revolving second drum means, positioned at adjacent ends of the second and the third conveyor belt means, for receiving the strips being transferrred from the second and third conveyor belt means.

15. The machine, according to claim 14, wherein: said third conveyor belt means is located at a position adjacent to the second drum means.

16. The machine, according to claim 14, further comprising: tray means, arranged beneath the first drum means, for catching waste material left after the first knife means cuts the segments into strips.

17. The machine, according to claim 14, further comprising:
means, operatively connected to the second and the third conveyor belt means, for synchronizing the speed of the said second and third conveyor belt means with the speed of the revolving second drum means.

18. The machine, according to claim 14, wherein: said second drum means has a plurality of chambers, formed therein with a first set of airtight sealing joints therebetween, for housing the strips.

19. The machine, according to claim 18, wherein: said plurality of chambers are provided with a second set of airtight sealing joints.

20. The machine, according to claim 18, further comprising:
first means, operatively connected to the plurality of chambers in the second drum means, for creating a vacuum so that the strips adhere in the plurality of chambers against centrifugal and gravitational forces.

21. The machine, according to claim 20, further comprising:
second means, operatively connected to the second conveyor belt means, for creating a vacuum so that the strips adhere thereon.

22. The machine, according to claim 18, further comprising:
second knife means, mounted on the second drum means, for cutting the strips into closing tops; and
means, operatively connected to the second drum means, for subjecting the second knife means to an alternating movement dependent on rotational speed of the second drum means.

23. The machine, according to claim 22, further comprising:
a turning plate, having a rotational axis arranged substantially coaxial to a rotational axis of the revolving second drum means and provided with a plurality of housings for pitted fruits in alignment with the plurality of chambers in the second drum means.

24. The machine, according to claim 23, further comprising:
means, positioned adjacent to the second drum means for pushing the tops out of the plurality of chambers in the second drum means into the pitted fruits aligned in the plurality of housings in the turning plate.

25. The machine, according to claim 23, further comprising:
a rotating pitter machine positioned in close proximity to the turning plate; and
means, operatively connected to the pitter machine, for synchronizing the rotating pitter machine with the turning plate.

26. The machine, according to claim 25, wherein: said pitter machine includes means for transferring the pitted fruits into the plurality of housings in the turning plate.

* * * * *